United States Patent
Shoji et al.

(10) Patent No.: US 7,170,841 B2
(45) Date of Patent: Jan. 30, 2007

(54) INFORMATION RECORDING MEDIUM, RECORDING APPARATUS, REPRODUCTION APPARATUS, RECORDING METHOD, AND REPRODUCTION METHOD

(75) Inventors: Mamoru Shoji, Osaka (JP); Takashi Ishida, Kyoto (JP); Motoshi Ito, Osaka (JP); Hiroshi Ueda, Nara (JP); Yoshikazu Yamamoto, Osaka (JP); Atsushi Nakamura, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 333 days.

(21) Appl. No.: 10/348,027

(22) Filed: Jan. 20, 2003

(65) Prior Publication Data

US 2003/0137915 A1    Jul. 24, 2003

(30) Foreign Application Priority Data

| Jan. 22, 2002 | (JP) | ............................. 2002-013493 |
| Mar. 1, 2002 | (JP) | ............................. 2002-056479 |
| Nov. 1, 2002 | (JP) | ............................. 2002-320444 |

(51) Int. Cl.
G11B 7/24 (2006.01)
G11B 7/0045 (2006.01)

(52) U.S. Cl. ............................. 369/59.25; 369/275.3; 369/283; 369/94

(58) Field of Classification Search ............ 369/30.04, 369/30.08, 47.51, 47.52, 53.22, 47.15, 94, 369/275.2, 275.3; 720/718
See application file for complete search history.

(56) References Cited

U.S. PATENT DOCUMENTS

| 5,185,733 | A | * | 2/1993 | Finkelstein et al. ...... 369/47.52 |
| 5,206,850 | A | * | 4/1993 | Tezuka et al. ........... 369/47.31 |
| 5,210,734 | A | * | 5/1993 | Sakurai ................... 369/47.16 |
| 5,212,563 | A | * | 5/1993 | Sato ............................ 386/104 |
| 5,537,381 | A | * | 7/1996 | Fuji ......................... 369/13.27 |
| 5,612,939 | A | * | 3/1997 | Ueki et al. ............... 369/47.11 |
| 5,715,225 | A | | 2/1998 | Gage et al. |
| 5,764,620 | A | | 6/1998 | Azumatani et al. |
| 6,577,590 | B2 | * | 6/2003 | Minamino et al. ........ 369/275.3 |
| 6,633,534 | B1 | * | 10/2003 | Tosaki et al. ............ 369/275.3 |
| 6,728,174 | B1 | * | 4/2004 | Sako et al. ................ 369/47.1 |

(Continued)

FOREIGN PATENT DOCUMENTS

EP    0 817 195 A    1/1998

(Continued)

OTHER PUBLICATIONS

International Search Report for corresponding Application No. PCT/JP2003/00445 mailed Sep. 29, 2003.

(Continued)

*Primary Examiner*—Brian E. Miller
*Assistant Examiner*—Peter Vincent Agustin
(74) *Attorney, Agent, or Firm*—Renner, Otto, Boisselle & Sklar, LLP

(57) ABSTRACT

An information recording medium is provided, which comprises a plurality of recording layers and a first disc information area for storing parameters relating to access to the plurality of recording layers and formats relating to the plurality of recording layer. The first disc information area is provided in a first recording layer which is one of the plurality of recording layers.

3 Claims, 14 Drawing Sheets

U.S. PATENT DOCUMENTS

| | | | |
|---|---|---|---|
| 6,772,429 B2* | 8/2004 | Yoon et al. | 720/718 |
| 6,845,071 B2* | 1/2005 | Shoji et al. | 369/47.53 |
| 2002/0048241 A1* | 4/2002 | Kumagai et al. | 369/47.39 |
| 2002/0051417 A1* | 5/2002 | Muramatsu et al. | 369/59.25 |
| 2002/0054550 A1* | 5/2002 | Tomita | 369/47.5 |
| 2002/0150014 A1* | 10/2002 | Nijboer et al. | 369/47.54 |
| 2002/0159382 A1 | 10/2002 | Nakane et al. | |
| 2002/0176346 A1 | 11/2002 | Park et al. | |
| 2003/0031098 A1* | 2/2003 | Shoji et al. | 369/44.26 |
| 2003/0185121 A1* | 10/2003 | Narumi et al. | 369/47.53 |
| 2004/0062188 A1* | 4/2004 | Yamamoto et al. | 369/275.3 |

FOREIGN PATENT DOCUMENTS

| | | |
|---|---|---|
| EP | 1 168 313 A | 1/2002 |
| JP | 05-266491 | 10/1993 |
| JP | 10-222874 | 8/1998 |
| JP | 2000-293947 | 10/2000 |
| JP | 2000-311346 | 11/2000 |
| JP | 2001-014808 | 1/2001 |
| JP | 2002-150568 | 5/2002 |
| JP | 2002-260241 | 9/2002 |
| JP | 2003-123333 | 4/2003 |
| WO | 97/15050 | 4/1997 |
| WO | 00/57410 | 9/2000 |
| WO | 01/18799 A1 | 3/2001 |

OTHER PUBLICATIONS

Japanese Office Action (2005-234537) dated Sep. 29. 2005.
Japanese Office Action (2005-234538) dated Sep. 29, 2005.
Japanese Office Action (2005-234539) dated Sep. 29, 2005.
Japanese Office Action (2005-289282) dated Nov. 16, 2005.
Japanese Office Action (2005-289280) dated Nov. 24, 2005.
Japanese Office Action (2005-289281) dated Nov. 24, 2005.
Japanese Office Action (2005-289282) dated Feb. 27, 2006.
Japanese Office Action (2006-021555) dated Feb. 27, 2006.

* cited by examiner

First recording layer 104 — 401

Second recording layer 102 — 402

Recording and reproduction direction

First recording layer 104 — 501

Second recording layer 102 — 502

Recording and reproduction direction

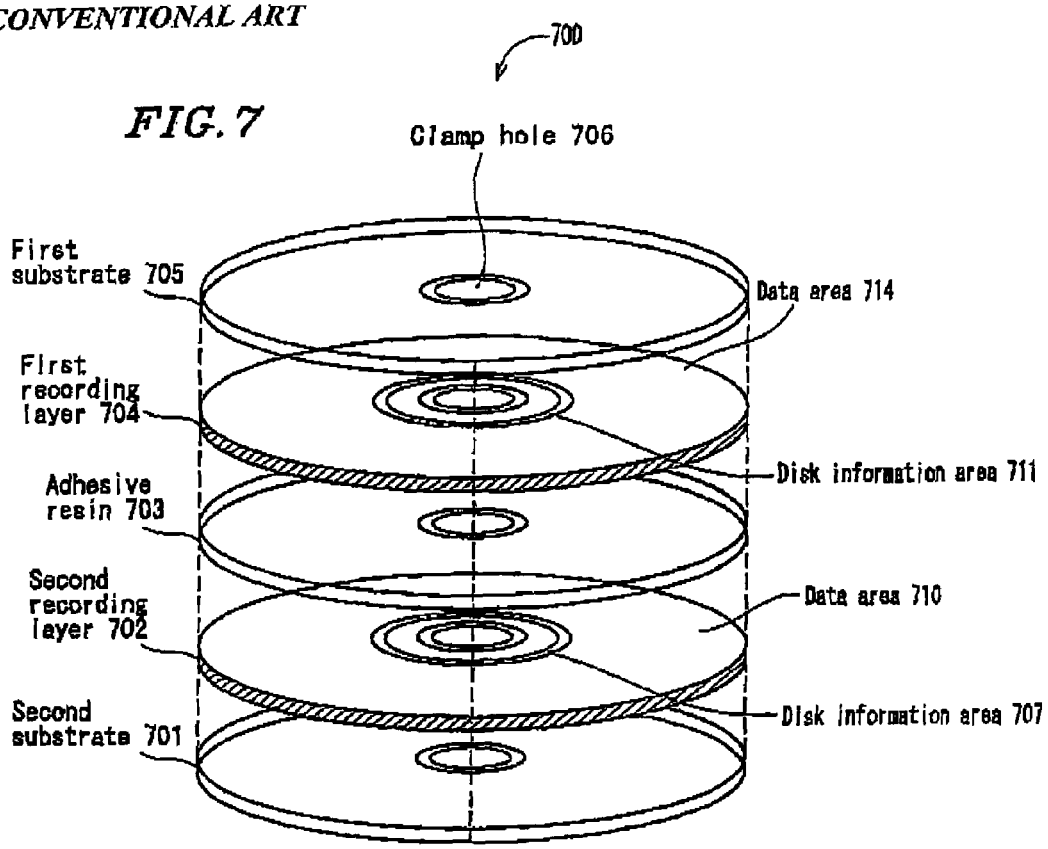

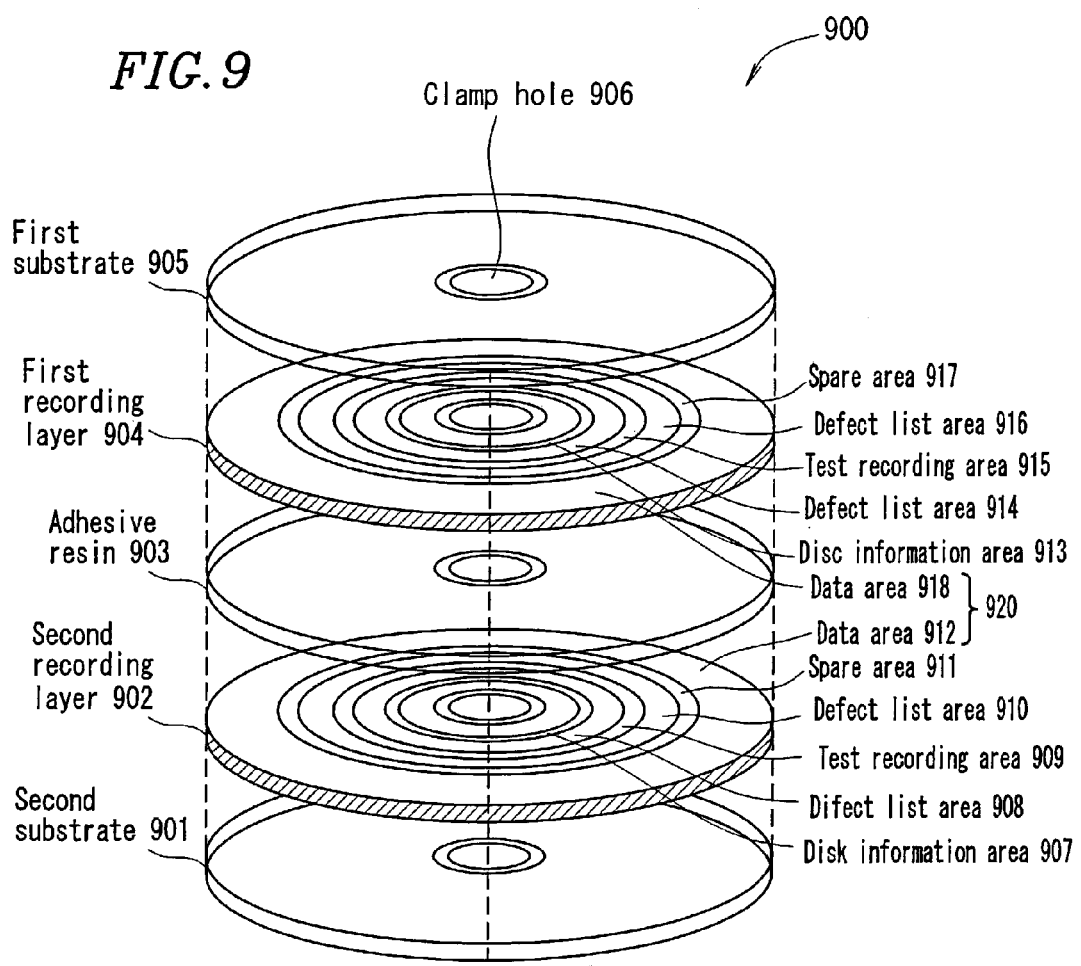

US 7,170,841 B2

INFORMATION RECORDING MEDIUM, RECORDING APPARATUS, REPRODUCTION APPARATUS, RECORDING METHOD, AND REPRODUCTION METHOD

BACKGROUND OF THE INVENTION

1. Field of the Invention

The present invention relates to an information recording medium comprising at least two recording layers, a method and apparatus for recording information onto this medium, and a method and apparatus for reproducing information from this medium.

2. Description of the Related Art

In recent years, various information recording media capable of recording/reproducing a large volume of information have been developed. Among them are optical discs. One of large-capacity optical discs is a double-sided optical disc comprising two optical discs attached together, on each of which information can be recorded/reproduced. However, there is a demand for a high-capacity, but single-sided and random access disc which is unnecessary to be turned upside down, for some applications, such as computers, games, and the like, in which random accesses are frequently required.

To meet such a demand (high-capacity, random access, and single-sided), it is conceivable that a single optical disc comprises at least two recording layers (such an optical disc may be referred to be a multi-layer optical disc), where information can be recorded/reproduced on a single side thereof. FIG. 7 shows a configuration of an optical disc 700 comprising two recording layers on one side thereof.

The optical disc 700 comprises a first recording layer 704, a first substrate 705, an adhesive resin 703, a second substrate 701, and a second recording layer 702. Each substrate is provided with a clamp hole 706. The second recording layer 702 comprises a disc information area 707 and a data area 710. The first recording layer 704 comprises a disc information area 711 and a data area 714.

The first substrate 705 and the second substrate 701 are made of polycarbonate resin or the like and are used to protect the first recording layer 704 and the second recording layer 702, respectively. The disc information area 707 is a reproduction-only area in which information, such as the power of laser light to irradiate the second recording layer 702 and the like. The disc information area 711 is also a reproduction-only area in which information, such as the power of laser light to irradiate the first recording layer 704, and the like.

In the optical disc 700, for example, reproduction is first performed on the first recording layer 704, immediately followed by reproduction on the second recording layer 702. In this case, reproduction operations are performed in the following order: information indicating the power of laser light for irradiating the first recording layer 704 is reproduced from the disc information area 711; reproduction is performed on the data area 714; information indicating the power of laser light for irradiating the second recording layer 702 is reproduced from the disc information area 707; and reproduction is performed on the data area 710. Alternatively, reproduction operations are performed on the disc information area 711, the disc information area 707, the data area 714, and the data area 710 in this order. Thus, in the optical disc 700, information has to be reproduced from two disc information areas. Therefore, it takes a long time to reproduce information of the parameters and formats of the optical disc 700, such as the power of laser light and the like.

SUMMARY OF THE INVENTION

According to an aspect of the present invention, an information recording medium comprises a plurality of recording layers, and a first disc information area for storing parameters relating to access to the plurality of recording layers and formats relating to the plurality of recording layer. The first disc information area is provided in a first recording layer which is one of the plurality of recording layers.

In one embodiment of this invention, an address is assigned to the first recording layer. The parameters include first irradiation power information indicating a value of a power of laser light which is used to irradiate the first recording layer, and second irradiation power information indicating a value of power of laser light which is used to irradiate another recording layer of the plurality of recording layers. An address assigned to an area in the first disc information area in which the first irradiation power information is stored is smaller than an address assigned to an area in the first disc information area in which the second irradiation power information is stored.

In one embodiment of this invention, the information recording medium further comprises a second disc information area for storing the same information as that of the first disc information area. The second disc information area is provided in a second recording layer which is another one of the plurality of recording layers.

In one embodiment of this invention, the first recording layer is one of the plurality of recording layers which is previously determined as a reference layer.

In one embodiment of this invention, the plurality of recording layers are recording layers capable of recording information. The information recording medium further comprises a plurality of adjustment areas for adjusting recording power of laser light. Each of the plurality of recording layers comprises a corresponding one of the plurality of adjustment areas.

In one embodiment of this invention, the second recording layer which is one of the plurality of recording layers comprises a buffer area. The buffer area is contiguous to one of the plurality of adjustment areas included in the second recording layer.

In one embodiment of this invention, each of the plurality of adjustment areas is provided at a different radial position on the information recording medium.

In one embodiment of this invention, the information recording medium is a write-once-read-many information recording medium.

In one embodiment of this invention, an address is assigned to the first recording layer. The parameter includes a first parameter relating to access to the first recording layer and a second parameter relating to another one of the plurality of recording layers. An address assigned to an area in the first disc information area in which the first parameter is stored is smaller than an address assigned to an area in the first disc information area in which the second parameter is stored.

In one embodiment of this invention, an address is assigned to the first recording layer. The format includes a first format relating to the first recording layer and a second format relating to another one of the plurality of recording layers. An address assigned to an area in the first disc information area in which the first format is stored is smaller than an address assigned to an area in the first disc information area in which the second format is stored.

In one embodiment of this invention, the information recording medium further comprises a data area for recording user data provided in the plurality of recording layers. The plurality of recording layers are provided with a groove. A second recording layer which is one of the plurality of recording layers, comprises an area at the same radial position as that of the first disc information area and an area in which a portion of the data area is provided. A type of a shape of the groove provided in the area at the same radial position of the first disc information area is the same as a type of a shape of the groove provided in the area in which the portion of the data area is provided.

In one embodiment of this invention, a groove is provided in at least a portion of the plurality of recording layers. A second recording layer which is one of the plurality of recording layers does not have a groove in an area which is a portion of the second recording layer at the same radial position as that of the first disc information area.

In one embodiment of this invention, the plurality of recording layers are provided with a groove. A type of a shape of the groove in a second recording layer which is one of the plurality of recording layers is constant.

In one embodiment of this invention, the first recording layer is provided with a groove. A type of a shape of the groove in the first disc information area is different from a type of a shape of the groove in an area which is a portion of the first recording layer and is contiguous to the first disc information area.

In one embodiment of this invention, the first recording layer is provided with a groove. The groove in the first disc information area is continuous to the groove in an area which is a portion of the first recording layer and is contiguous to the first disc information area.

In one embodiment of this invention, the parameter and the format include a first parameter and a first format relating to the first recording layer. The parameter and the format include a second parameter and a second format relating to a second recording layer which is another one of the plurality of recording layers. The length of an area of the first disc information area storing the first parameter and the first format is the same as the length of an area of the first disc information area storing the second parameter and the second format.

In one embodiment of this invention, the parameter includes a first parameter relating to access to the first recording layer. The format includes a first format relating to the first recording layer. A set of the first parameter and the first format are continuously repeated and stored in the first disc information area.

In one embodiment of this invention, the parameter includes a second parameter relating to access to a second recording layer which is another one of the plurality of recording layers. The format includes a second format relating to the second recording layer. A set of the second parameter and the second format are continuously repeated and stored in the first disc information area.

In one embodiment of this invention, the disc information area stores a plurality of sets of the parameter and the format.

In one embodiment of this invention, the information recording medium further comprises a dummy area. The plurality of sets includes a first set and a second set. The dummy area is provided between a first area provided with the first set, the first area being a portion of the first disc information area, and a second area provided with the second set, the second area being another portion of the first disc information area.

In one embodiment of this invention, the length of the dummy area is an integral multiple of the length of an area storing a set of the parameter and the format.

In one embodiment of this invention, an address is assigned to the first recording layer. The parameter includes a first parameter relating to access to the first recording layer and a second parameter relating to another one of the plurality of recording layers. The first parameter and the second parameter are stored in an area having the same address assigned thereto in the first disc information area.

In one embodiment of this invention, an address is assigned to the first recording layer. The format includes a first format relating to access to the first recording layer and a second format relating to another one of the plurality of recording layers. The first format and the second format are stored in an area having the same address assigned thereto in the first disc information area.

According to another aspect of the present invention, a recording apparatus for recording information into an information recording medium is provided. The information recording medium comprises a plurality of recording layers, and a disc information area for storing parameters relating to access to the plurality of recording layers and formats relating to the plurality of recording layer. The disc information area is provided in a first recording layer which is one of the plurality of recording layers. The recording apparatus comprises an optical head capable of optically writing the information into the information recording medium, and a control section for controlling recording using the optical head. The recording comprises the steps of reproducing the parameter and the format stored in the disc information area, and recording the information into the information recording medium based on the reproduced parameter and format.

According to another aspect of the present invention, a reproduction apparatus for reproducing information from an information recording medium is provided. The information recording medium comprises a plurality of recording layers, and a disc information area for storing parameters relating to access to the plurality of recording layers and formats relating to the plurality of recording layer. The disc information area is provided in a first recording layer which is one of the plurality of recording layers. The reproduction apparatus comprises an optical head capable of optically reading the information from the information recording medium, and a control section for controlling reproduction using the optical head. The reproduction comprises the steps of reproducing the parameter and the format stored in the disc information area, and reproducing the information from the information recording medium based on the reproduced parameter and format.

According to another aspect of the present invention, a recording method for recording information into an information recording medium is provided. The information recording medium comprises a plurality of recording layers; and a disc information area for storing parameters relating to access to the plurality of recording layers and formats relating to the plurality of recording layer. The disc information area is provided in a first recording layer which is one of the plurality of recording layers. The recording method comprises the steps of reproducing the parameter and the format stored in the disc information area, and recording the information into the information recording medium based on the reproduced parameter and format.

According to another aspect of the present invention, a reproduction method for reproducing information from an information recording medium is provided. The information recording medium comprises a plurality of recording layers, and a disc information area for storing parameters relating to access to the plurality of recording layers and formats relating to the plurality of recording layer. The disc information area is provided in a first recording layer which is one of the plurality of recording layers. The reproduction method comprises the steps of reproducing the parameter and the format stored in the disc information area, and reproducing the information from the information recording medium based on the reproduced parameter and format.

Thus, the invention described herein makes possible the advantages of providing an information recording medium comprising at least two recording layers, a method and apparatus for recording information onto this medium, and a method and apparatus for reproducing information from this medium, in which the time required to reproduce information from the disc information area is reduced.

These and other advantages of the present invention will become apparent to those skilled in the art upon reading and understanding the following detailed description with reference to the accompanying figures.

BRIEF DESCRIPTION OF THE DRAWINGS

FIG. 7 is a diagram showing a conventional optical disc.

FIG. 9 is a diagram showing an optical disc according to an embodiment of the present invention.

DESCRIPTION OF THE PREFERRED EMBODIMENTS

Hereinafter, the present invention will be described by way of illustrative examples with reference to the accompanying drawings.

Figure 1:
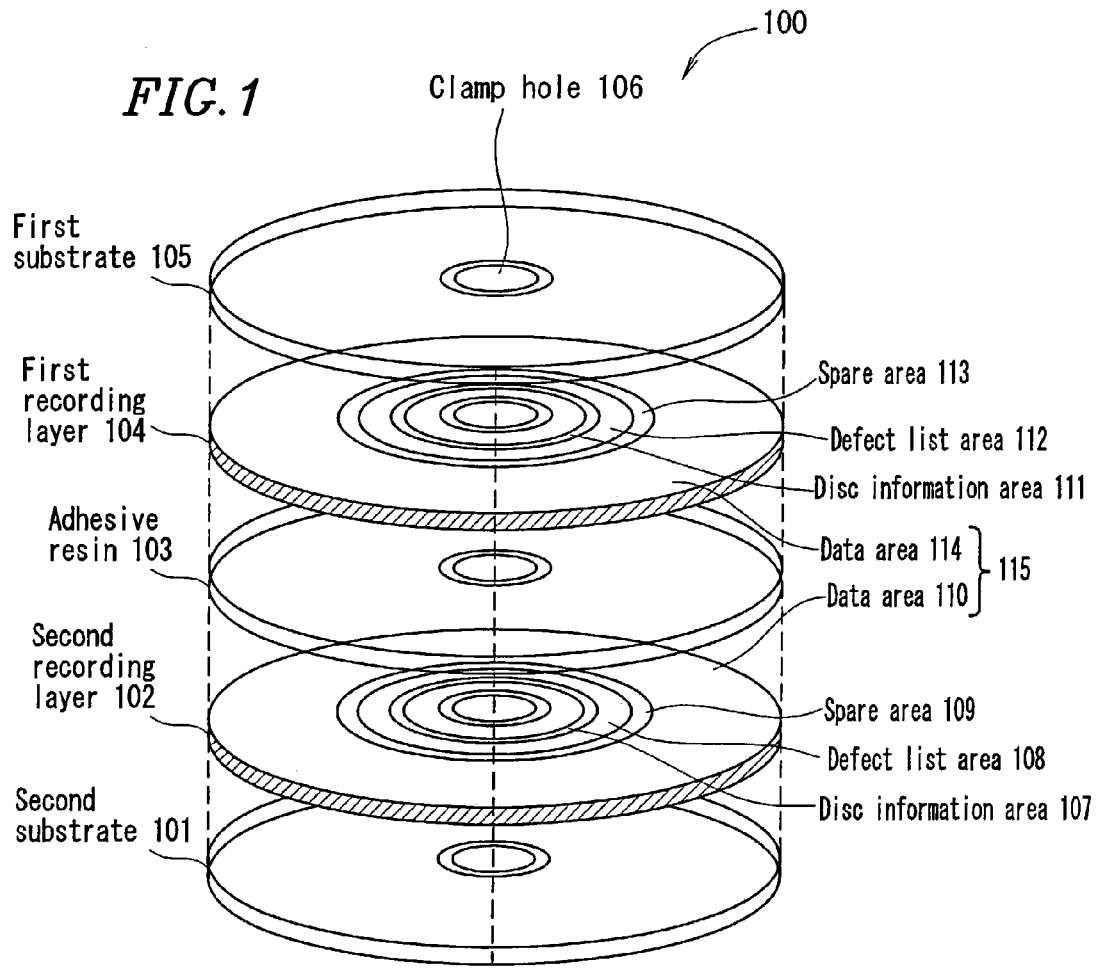
FIG. 1 is a diagram showing an optical disc according to an embodiment of the present invention.

FIG. 1 shows a rewritable optical disc 100 comprising two recording layers according to an embodiment of the present invention.

The optical disc 100 comprises a first recording layer 104, a first substrate 105, an adhesive resin 103, a second substrate 101, and a second recording layer 102. Each of these substrates and recording layers is provided with a clamp hole 106. The optical disc 100 has a data area 115 for recording user data. The data area 115 is provided on both the first recording layer 104 and the second recording layer 102. The data area 115 comprises a data area 110 provided on the second recording layer 102 and a data area 114 provided on the first recording layer 104.

The second recording layer 102 comprises a disc information area 107, a defect list area 108, a spare area 109, and the data area 110. The first recording layer 104 comprises a disc information area 111, a defect list area 112, a spare area 113, and the data area 114. The first recording layer 104 and the second recording layer 102 are provided on one side of the optical disc 100.

The disc information area 107, the defect list area 108, the spare area 109, the data area 110, the disc information area 111, a defect list area 112, the spare area 113, and the data area 114 are each provided with a plurality of spiral or concentric tracks. Each track comprises a plurality of sectors.

Figure 2A:
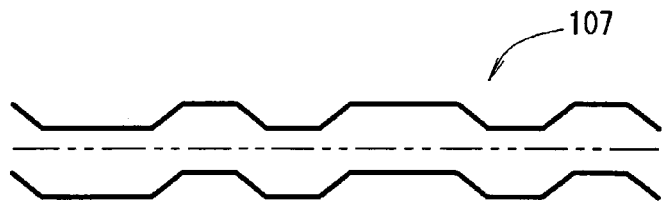
FIG. 2A is a diagram showing a track provided in a recording layer according to an embodiment of the present invention.
Figure 2B:
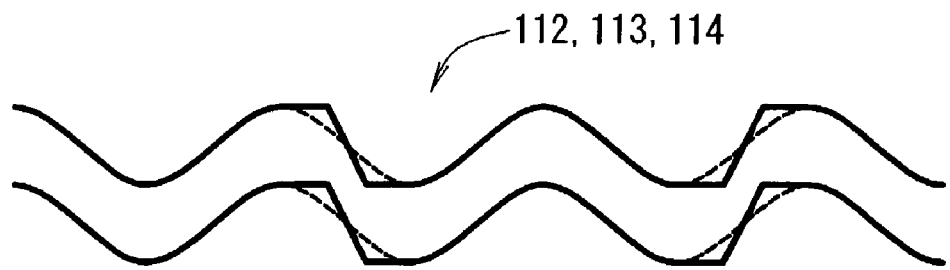
FIG. 2B is a diagram showing a track provided in a recording layer according to an embodiment of the present invention.
Figure 2C:
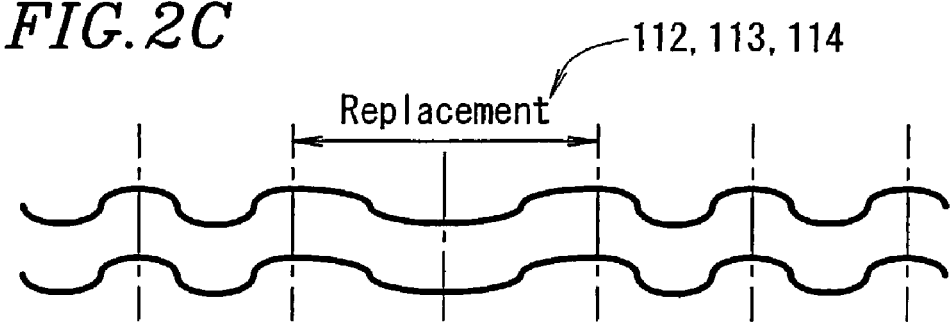
FIG. 2C is a diagram showing a track provided in a recording layer according to an embodiment of the present invention.
Figure 2D:
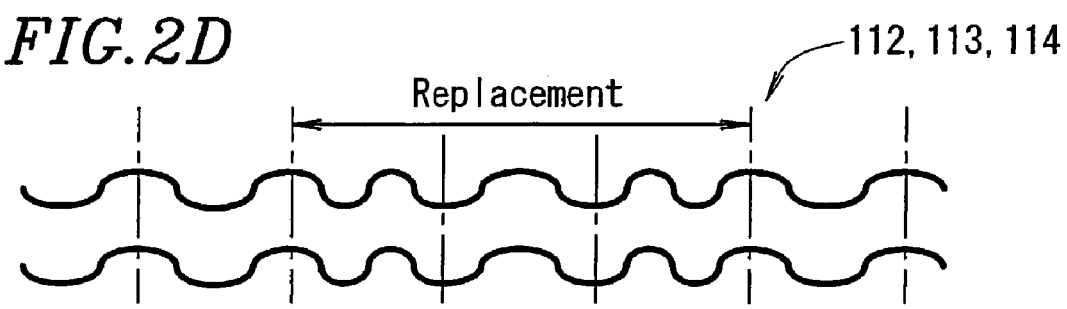
FIG. 2D is a diagram showing a track provided in a recording layer according to an embodiment of the present invention.

Here, the defect list area 108, the spare area 109, the data area 110, the defect list area 112, the spare area 113, and the data area 114 are recordable areas, in which the track is meandering at predetermined cycles. Referring to FIG. 2B, address information or the like can be recorded in a track by overlaying a high frequency component onto a track. Alternatively, referring to FIG. 2C, address information or the like can be recorded in a track by replacing a segment corresponding to an integral multiple of a predetermined cycle with a segment having a different frequency. Alternatively, referring to FIG. 2D, the segment corresponding to an integral multiple of a predetermined cycle may be replaced with a segment having a partially modulated pattern or a combination of frequencies. By forming the type of the shape of the track as shown in FIG. 2C and FIG. 2D, the continuity of the phase of a predetermined cyclic portion can be obtained, thereby making it easy to perform clock extraction.

The first substrate 105 and the second substrate 101 are made of a polycarbonate resin or the like and are used to protect the first recording layer 104 and the second recording layer 102, respectively. The disc information area 107 is a reproduction-only area in which parameters for accessing the first recording layer 104 and the second recording layer 102 and the formats of the first recording layer 104 and the second recording layer 102. The disc information area 111 is also a reproduction-only area in which the parameters for accessing the first recording layer 104 and the second recording layer 102 and the formats of the first recording layer 104 and the second recording layer 102. The disc information area 111 records the same information as that in the disc information area 107. The optical disc 100 may have both the disc information area 107 and the disc information area 111, or either the disc information area 107 or the disc information area 111. The parameters stored in the disc information area 107 are second irradiation power information indicating the irradiation power of laser light appropriate for the second recording layer 102 when information is recorded/reproduced on the second recording layer 102 and first irradiation power information indicating the irradiation power of laser light appropriate for the first recording layer 104 when information is recorded/reproduced on the first recording layer 104. The parameters stored in the disc information area 111 are second irradiation power information indicating the irradiation power of laser light appropriate for the second recording layer 102 when information is recorded/reproduced on the second recording layer 102 and first irradiation power information indicating the irradiation power of laser light appropriate for the first recording layer 104 when information is recorded/reproduced on the first recording layer 104. Information is recorded on the medium by modulating a track radially for each cycle or every double cycle. An example of the track modulation is shown in FIG. 2A.

In this embodiment, different types of track shapes are used between reproduction-only areas (e.g., the disc information area 107, the disc information area 111, and the like) and recordable areas (e.g., the defect list area 108, the spare area 109, the data area 110, the defect list area 112, the spare area 113, the data area 114, and the like). Thereby, an optical disc recording/reproduction apparatus can determine whether or not an area on which reproduction is currently performed is a disc information area, before reproducing an address recorded in a track.

For multi-layer discs, the irradiation power of laser light, which is used to reproduce information from the farthest layer from the disc surface through which the information is read, may be greater than the irradiation power of laser light, which is used for single-layer discs. Therefore, the irradiation power of laser light for single-layer discs may be insufficient to reproduce an address from the optical disc 100, however, maybe sufficient to recognize a disc information area based on the waveform of a tracking signal derived from the shape of a track groove.

Figure 3:
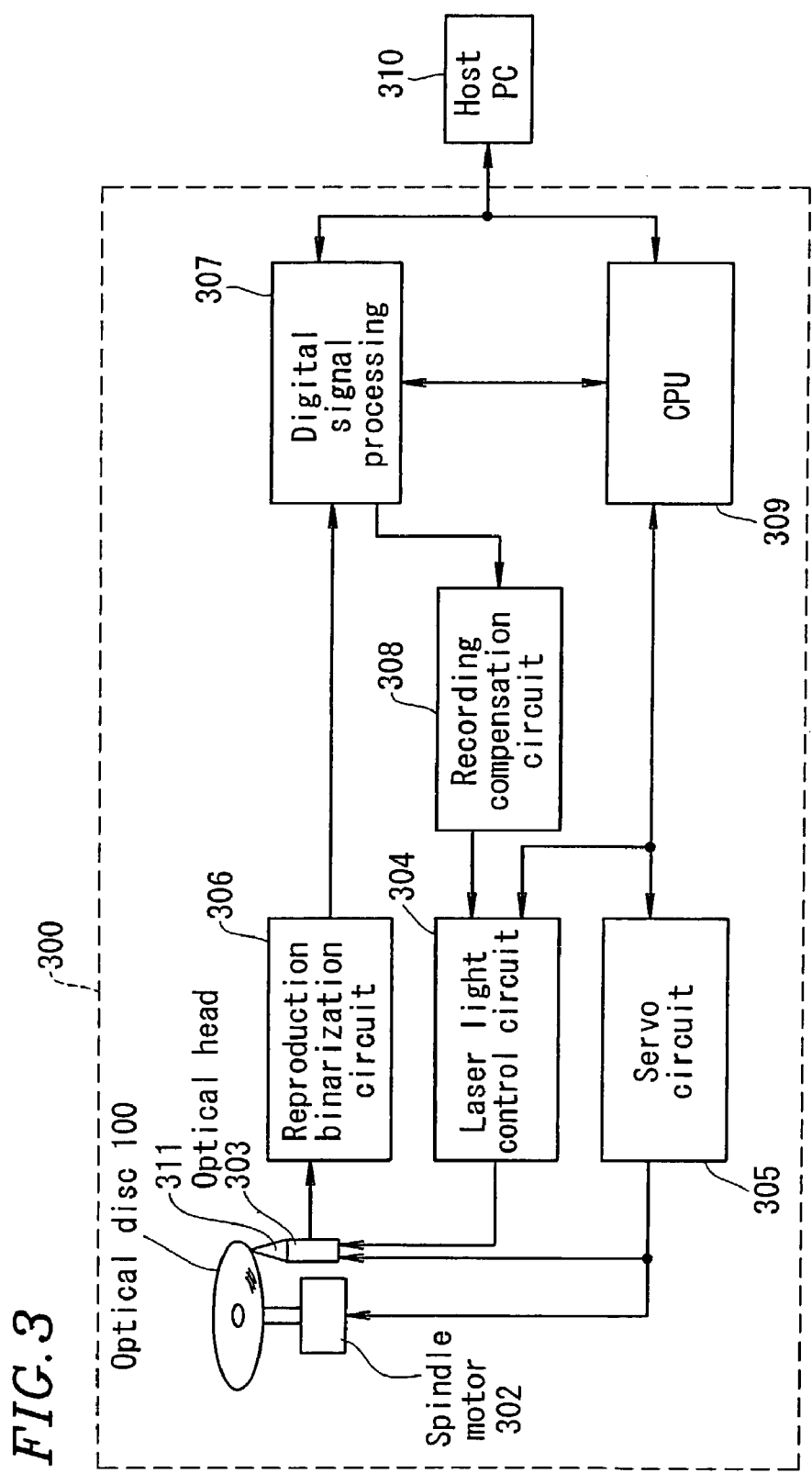
FIG. 3 is a diagram showing a recording/reproduction apparatus according to an embodiment of the present invention.

FIG. 3 shows a recording/reproduction apparatus 300 according to an embodiment of the present invention. The recording/reproduction apparatus 300 comprises a spindle motor 302, an optical head 303, a laser light control circuit 304, a servo circuit 305, a reproduction binarization circuit 306, a digital signal processing circuit 307, a recording compensation circuit 308, and a CPU 309.

The optical disc 100 (FIG. 1) is loaded into the recording/reproduction apparatus 300. The recording/reproduction apparatus 300 transmits and receives information to and from a host PC 310.

The CPU 309, which functions as a control section, controls all operations within the recording/reproduction apparatus 300 in accordance with a built-in control program. As described below, the optical head 303 optically writes information the optical disc 100 on the one side thereof. Further, the optical head 303 can optically read information from the optical disc 100. The CPU 309 controls recording and reproduction operations using the optical head 303. The recording operation comprises the steps of reproducing parameters and formats stored in a disc information area, and recording user data onto the optical disc 100 based on the reproduced parameters and formats. The reproduction operation comprises the steps of reproducing parameters and formats stored in a disc information area, and reproducing user data recorded in the optical disc 100 based on the reproduced parameters and formats. Hereinafter, an operation of the recording/reproduction apparatus 300 will be described in detail.

The optical disc 100 has the structure as described above with reference to FIG. 1. The spindle motor 302 is a motor for rotating the optical disc 100. The optical head 303 irradiates the optical disc 100 with laser light as well as converts laser light 311 reflected from the optical disc 100 into an electric signal to output a reproduction signal. The laser light control circuit 304 controls the power of laser light output from the optical head 303. These controls are carried out in accordance with instructions from the CPU 309. The servo circuit 305 controls the position of the optical head 303, focusing, tracking, and the rotation of the spindle motor 302. The reproduction binarization circuit 306 subjects the reproduction signal (data information is an addition signal, and information relating to a disc information area or an address is a subtraction signal) obtained by the optical head 303 to amplification and binarization to produce a binarization. A built-in PLL (not shown) is used to produce clocks synchronized with the binarization signal.

The digital signal processing circuit 307 subjects the binarization signal to a predetermined demodulation process or error correction process. When recording data, the recorded data is subjected to an error correction code addition process and a predetermined demodulation process to produce the modulated data. The recording compensation circuit 308 converts the modulated data into optically modulated data comprising a pulse sequence, and also delicately adjusts the pulse width or the like of the optically modulated data based on the reproduction signal of a disc information area or data previously stored in the CPU 309 so as to produce a recording pulse signal suitable for pit formation. The CPU 309 controls all operations within the recording/reproduction apparatus 300. The host PC 310 comprises a computer (not shown), an application (not shown), an operating system (not shown), and the like, and requests the recording/reproduction apparatus 300 to perform recording or reproduction of information.

When the optical disc 100 is loaded into the recording/reproduction apparatus 300, information is reproduced from the disc information area 111 using the optical head 303 having a predetermined irradiation power in accordance with signals from the laser light control circuit 304 and the servo circuit 305. In this case, the reproduced information is irradiation power information which is used to record information (user data) into the first recording layer and the second recording layer, or the like. When requested by the host PC 310, the CPU 309 sets a recording power for recording information into the first recording layer 104 to the laser light control circuit 304, and controls the optical head 303 to record information into the data area 114. Next, the CPU 309 sets a recording power for recording information into the second recording layer 102 to the laser light control circuit 304, and controls the optical head 303 to record information into the data area 110.

The disc information area 111 of the optical disc 100 contains the parameters and formats (irradiation power information for recording, or the like) of both the first recording layer 104 and the second recording layer 102, whereby information is reproduced from the disc information area only once. Therefore, the time required to access to a disc information area can be reduced as compared to when information is reproduced from the disc information area 107 to record data into the second recording layer 102 while information is reproduced from the disc information area 111 to record data into the first recording layer 104.

In this embodiment, parameter and formats are recorded in both the disc information area 107 and the disc information area 111, thereby making it possible to obtain irradiation power information or the like from either layer. Therefore, even when information is reproduced from a layer different from a predetermined recording layer due to the irregular thickness of the adhesive resin 103 or disturbances in the focusing control of the servo circuit 305, information required for recording can be reproduced and obtained from that layer.

In this embodiment, irradiation power information and the like are recorded in both the disc information area 107 and the disc information area 111. Therefore, the time required before recording data can be reduced, for example, by reproducing information from the disc information area 111 when recording data into the data area 114 first or reproducing information from the disc information area 107 when recording data into the data area 110 first.

In this embodiment, the optical disc 100 has two layers, i.e., the first recording layer 104 and the second recording layer 102. Alternatively, the optical disc 100 may have three or more recordable recording layers. In this embodiment, the recording formats of information recorded in the disc information area 107 and the disc information area 111 are such that the meandering pattern of a track is radially modulated for each fundamental cycle and every double cycle. Alternatively, as shown in FIG. 2B, information may be recorded in a track meandering at predetermined cycles by overlaying a high frequency component onto the track. Alternatively, as shown in FIGS. 2C and 2D, information can be recorded in a track meandering at predetermined cycles by replacing a segment of the track with a segment having a different frequency or pattern. Particularly, by using the same type of the shape of the track groove, it is possible to produce a substrate more easily.

In this embodiment, the disc information area 107 and the disc information area 111 each have a plurality of spiral or concentric tracks. Information may be recorded in the disc information area 107 and the disc information area 111 in the form of pits and lands. Information may be recorded in a disc information area by the same method as that for recording data into a data area before factory shipment or the like.

The disc information area 107 and the disc information area 111 may have a track pitch (or a pit pitch in a radial direction) different from those of the defect list area 108, the spare area 109, the data area 110, the defect list area 112, the spare area 113, and the data area 114 (or a pit pitch in a radial direction). By expanding the track pitch in a disc information area, the influence of contiguous tracks can be reduced.

By expanding the track pitch or the pit pitch in a disc information area to be greater than the track pitch or the pit pitch of a recordable area, such as a data area or the like, it is possible to reproduce information from a disc information area even when using an optical disc apparatus having an optical head with a long laser wavelength, for example. In this case, a minimum of information can be returned to the user. In other words, by expanding the compatibility of a disc information area between different types of optical disc apparatuses, even when information cannot be recorded due to the apparatus specification, the reason that recording cannot be performed can be clarified.

When the spot of laser light is vertically shifted from one layer to another layer, it is difficult to locate the spot at the same radial position due to misalignment of substrates attached together, misalignment of the clamp holes of the substrates, or the like. For example, when it is attempted to move from the $1000^{th}$ track from the inside circumference of the first recording layer 104 to the $1000^{th}$ track from the inside circumference of the second recording layer 102, an error of about ±50 tracks occurs. Therefore, when the spot of laser light is shifted from layer to layer in the vicinity of a boundary between a reproduction-only track and a recordable track, if the track on the destination layer is discontinuous, a reproduction or recording operation becomes unstable and cannot be quickly performed.

Therefore, even when the track pitch of the disc information area 107 and the disc information area 111 is different from the track pitch of the defect list area 108, the spare area 109, the data area 110, the defect list area 112, the spare area 113, and the data area 114, it is desirable that the track groove of the disc information area 107 is continuously linked to the track groove of an area contiguous to the disc information area 107 (e.g., the area is the defect list area 108 in the example of FIG. 1; and the area may be the spare area 109 or the data area 110). Similarly, it is desirable that the track groove of the disc information area 111 is continuously linked to the track groove of an area contiguous to the disc information area 111 (e.g., the area is the defect list area 112 in the example of FIG. 1; and the area may be the spare area 113 or the data area 114). It is desirable that transition of the track pitch is completed within about 100 tracks in view of data capacity. However, it is desirable that pitches are varied as moderately as possible. In view of servo, the difference between the track pitch of a disc information area and the track pitch of a defect list area, a spare area, or a data area is desirably about 10% and about 15% at maximum in order to perform reproduction quickly when the spot of laser light is shifted to a track on any layer.

In this embodiment, as shown in FIG. 2A, disc information is recorded in a disc information area by modulating a track radially for each fundamental cycle and every double cycle. As shown in FIG. 2B, FIG. 2C, and FIG. 2D, address information or the like is recorded in a defect list area, a spare area, and a data area by partially frequency-modulating a track meandering at predetermined cycles, or overlaying a high frequency component on the track. In the whole or a part of the transition area of track pitches, tracks may be formed in a modulation manner which is not used in any of a disc information area, a defect list area, a spare area, and a data area, or may not be modulated, or may not be meandering.

Thus, by changing the modulation method or the type of shape between the transition area of track pitches and its contiguous areas before and after the transition area, the recording/reproduction apparatus 300 can recognize the transition area quickly.

As described above, discontinuity is removed from a boundary between areas having different track pitches. Therefore, it is possible to quickly start processing in a destination area in an optical disc having a discontinuous portion as compared to when the spot of laser light is moved from a start position to the destination area which is largely radially distant from the discontinuous portion (starting position).

In this embodiment, a disc information area is provided in the most inside circumference of a disc. Alternatively, a disc information area may be provided in the most outside circumference of a disc, or both the inside and outside circumferences of a disc.

In this embodiment, the disc information area 107 and the disc information area 111 each contain irradiation power information and the like for both the first recording layer and the second recording layer. If a layer(s) on which reproduction is performed is specified, not all layers may contain irradiation power information and the like for all layers in their disc information areas.

A recording layer of the optical disc 100, which is located at substantially the same distance from the disc surface of the optical disc 100, through which information is read, as the distance from the disc surface of an optical disc comprising a single recording layer, through which information is read, is used as a reference layer. At least the reference layer may contain a disc information area. Therefore, disc information for any layer of the optical disc 100 can be obtained using a recording/reproduction apparatus for perform recording and reproduction on an optical disc comprising a single recording layer, thereby making it possible to simplify the structure of the recording/reproduction apparatus. A recording layer as a reference layer (e.g., the first recording layer 104) is previously determined from a plurality of recording layers.

Note that a degradation in a reproduction signal due to tilt is increased with an increase in distance from the disc surface. Therefore, it is desirable that the reference layer is located at substantially the same distance from the disc surface as the distance of the layer of a single-layer disc from the disc surface and the reference layer is the farthest layer from the disc surface. In this case, when the type of the shape of an area, which is a portion of a recording layer other than the reference layer and is located at the same radial position as that of a disc information area of the reference layer, is the same as the type of the shape of a data area in which user data is recorded, transmittances can be the same irrespective of the radial position. Therefore, no particular detection means for reproducing information from a disc information area of a reference layer is required, whereby the configuration of a recording/reproduction apparatus can be simplified and it is easier to produce a recording layer.

Particularly, in a multi-layer disc comprising a plurality of recording layers, the type of the shape of grooves in a recording layer(s) other than a reference layer is the same as the type of the shape of grooves in a data area (only one type of the shape of grooves is used), thereby simplifying production of a substrate.

When a reference layer contains a disc information area, it is possible to reduce the scatter of light in a recording layer(s) other than the reference layer by providing an area, which is a portion of a recording layer other than the reference layer and is located at the same radial position as that of a disc information area of the reference layer, with no groove (i.e., flat structure). Therefore, the quality of a reproduction signal from the reference layer can be improved.

By providing a disc information area only in a reference layer, it is easy to determine whether or not a currently reproduced recording layer is the reference layer by reproducing an area around a radial position at which a disc information area of an optical disc is provided.

A disc information area may store parameters relating to a plurality of recording layers, such as recommended irradiation power information for reproduction, recommended irradiation power information for recording, maximum irradiation power information, a pulse width in recording, a ratio between a plurality of irradiation powers combined in recording, a margin constant used in determining an irradiation power optimal for recording, and the like.

A disc information area may contain formats relating to a plurality of recording layers, such as the name of a disc, the size of a disc, version information, the disc type of any layer (i.e., an identifier indicating whether a layer is a recordable/reproducible layer or a reproduction-only layer), the number of all recordable layers, the number of all reproduction-only layers, and the number of all layers. The disc information area further contains formats relating to a plurality of recording layers, such as an identifier indicating whether or not information in any layer can be copied, clock information, an identifier for indicating whether or not BCA (Burst Cutting Area) for providing specific information after production of a disc is provided, a transfer rate, recording/reproduction directions, a physical address start number, a physical address end number, a logical address start number, a logical address end number, a shortest mark length, a recording rate, and the like.

By setting parameters required for recording and reproduction in each recording layer, the degree of freedom in designing discs can be improved. For example, when a plurality of recording layers are used to achieve high-density recording, variations in reflection in at least layers through which light is transmitted have to be taken into consideration. Therefore, a higher level of precision design is required than when recording is performed on only one recording layer. In this case, for example, if the first recording layer 104 and the second recording layer 102 have to be reproduced with the same irradiation power, it is inferred that the optical disc 100 has difficulty in designing recording layers. For example, the recording performance of the second recording layer 102 has to be secured under a high transmittance situation. To avoid this, irradiation power for reproduction is not limited, and instead, irradiation power information is recorded in a disc information area. Therefore, irradiation power can be increased when reproduction is performed in the first recording layer 104. The degree of freedom in designing a recording film of the second recording layer 102 can be increased.

By recording parameters required for recording and reproduction to be performed on any layer together into a disc information area of at least one recording layer, it is possible to quickly grasp a control method optimal to the whole disc.

BCA is used to further classify discs having the same contents in their disc information areas. Classification is recorded in the form of a bar code after production of discs. BCA is provided in at least one layer, and desirably in a reference layer. In this case, by providing a layer containing no BCA with a groove shape different from that of the reference layer, it is easy to recognize the reference layer by performing reproduction within a radial range of the reference layer in which BCA is provided. Particularly, in a recording layer other than the reference layer, a radial range in which BCA is provided is provided with a flat structure having no groove, thereby making it possible to reduce the scatter of light in other layers. Moreover, the quality of a reproduction signal from BCA can be improved and production of a substrate is facilitated.

Recording of information into BCA requires irradiation with laser having a power much higher than a power required when performing recording on a recordable area. Therefore, it is likely that the characteristics of the recording film of a recordable area, such as a defect list area, a spare area, a data area, or the like, is damaged. Therefore, it is desirable that recordable areas contain no BCA as well as no variation in recording positions. If a recordable area is contiguous to an area in which BCA is provided, it is desirable to provide a buffer area in which no intended use is defined between these areas. In this case, the net volume of the recordable area is reduced.

Figure 8A:
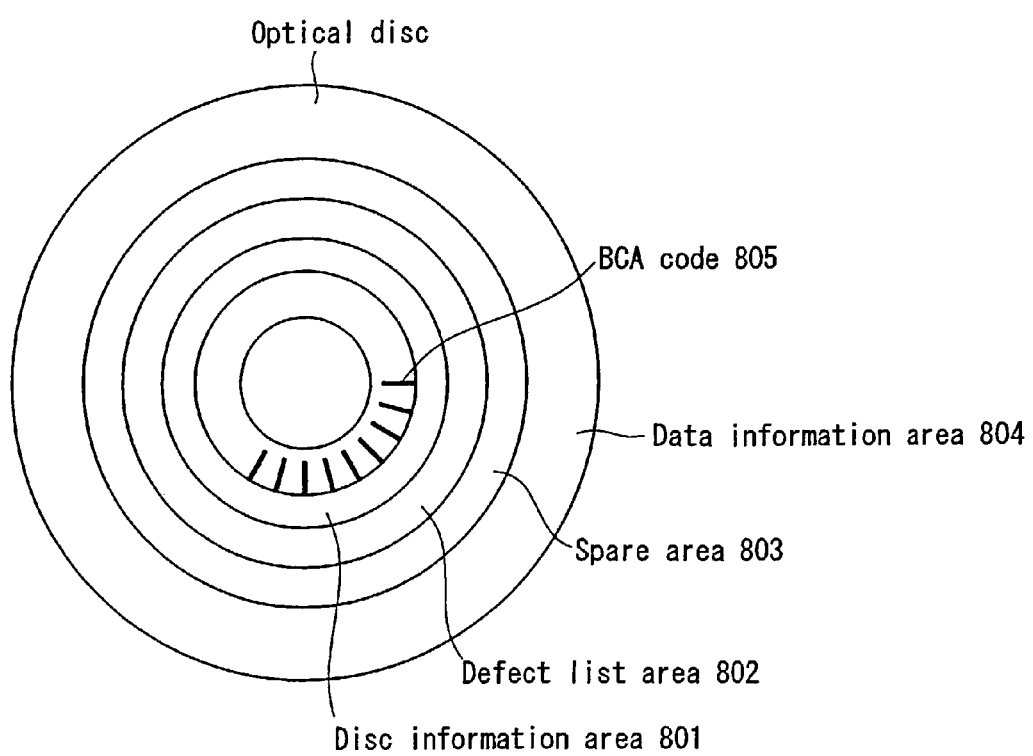
FIG. 8A is a diagram showing an optical disc according to an embodiment of the present invention.
Figure 8B:
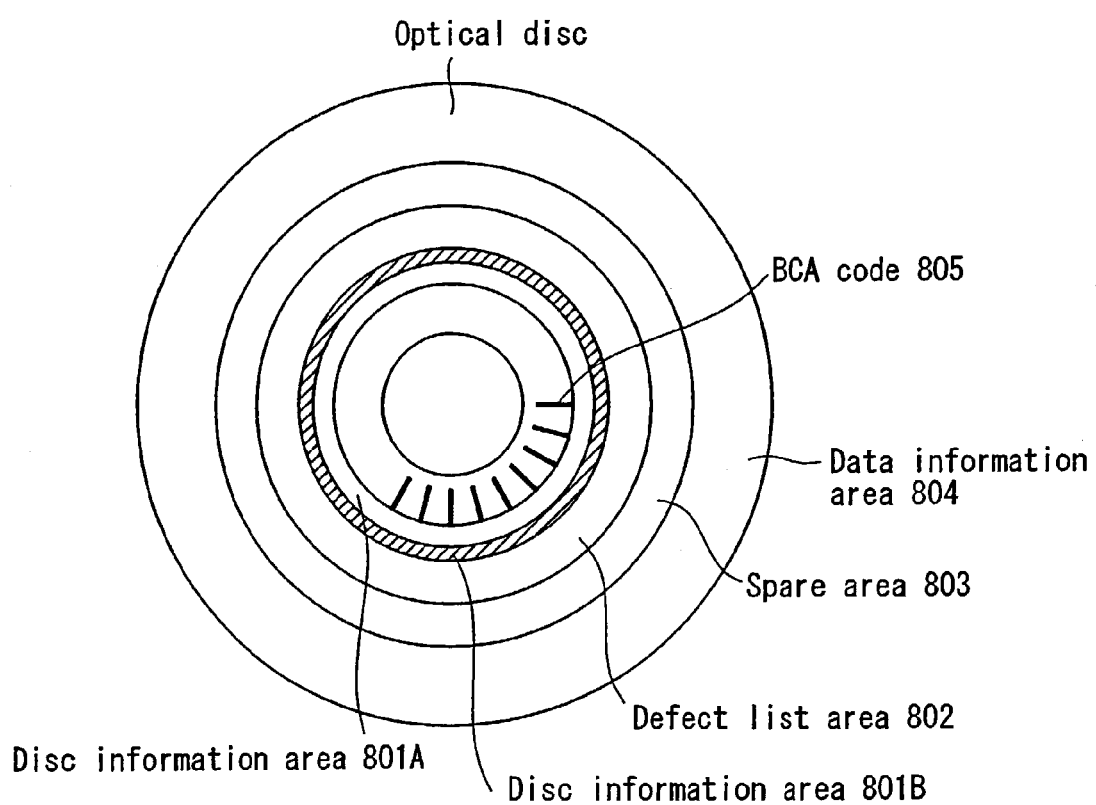
FIG. 8B is a diagram showing an optical disc according to an embodiment of the present invention.

According to the above-described viewpoint, it is typically desirable to provide an area, in which BCA is provided, at an end in a radial direction. It is not preferable to provide BCA at the outside circumference, since information in BCA is required when actuating as well as from the viewpoint of capacity. As shown in FIG. 8A, it is desirable to provide BCA in a more inside circumference than a disc information area. As described above, a disc is irradiated with a high power of laser when recording information into BCA, it is likely to damage data already recorded in a reproduction-only area. Therefore, as shown in FIG. 8B, a buffer portion, in which dummy data, such as, for example, "0", is provided, may be provided at an inside circumference of a disc information area (a disc information area 801A), and in fact, data is recorded at an outside circumference thereof (a disc information area 801B).

In this embodiment, disc information is recorded in a disc information area by radially modulating tracks for each fundamental cycle and every double cycle. Alternatively, a modulation method different from that for a disc information area may be used in an area in which BCA is provided. Conversely, tracks may be straight grooves with no modulation or may be meandering at predetermined cycles. Further, a track pitch may be different between an area provided with BCA and a disc information area. In this case, since it is likely that a track groove is damaged due to recording of information into BCA, the area containing BCA desirably has a larger track pitch.

As described above, it is possible for a recording/reproduction apparatus to quickly distinguish an are a provided with BCA from a disc information area by changing a track modulation method and the type of the shape of a track.

In general, when the spot of laser light is vertically shifted from one layer to another layer, it is difficult to locate the spot at the same radial position due to misalignment of substrates attached together, misalignment of the clamp holes of the substrates, or the like. For example, when it is attempted to move from the 1000$^{th}$ track from the inside circumference of the first recording layer 104 to the 1000$^{th}$ track from the inside circumference of the second recording layer 102, an error of about ±50 tracks occurs. Therefore, when the spot of laser light is shifted from layer to layer in the vicinity of a boundary between a reproduction-only track and a recordable track, if the track on the destination layer is discontinuous, a reproduction operation becomes unstable and cannot be quickly performed. Therefore, even when an area in which BCA is provided and a disc information area have different track pitches, it is desirable that these areas are continuously linked together. Moreover, it is desirable that track pitches are moderately changed.

It is desirable that irradiation power information for reproduction precedes irradiation power information for recording. In this case, when a request from a host PC is reproduction, data can be quickly reproduced if the irradiation power information for recording is not reproduced.

Parameters and formats recorded in a disc information area required for performing recording and reproduction on any layer may be recorded in tracks in the defect list area 108, the spare area 109, the data area 110, the defect list area 112, the spare area 113, and the data area 114. Since such information is recorded in any track, for example, when a request for reproduction is received from the host PC 310, information minimally required for reproduction, such as irradiation power or the like, is reproduced from the disc information area which does not have a risk of deleting user data with irradiation power for reproduction. Next, the remaining information, such as, for example, irradiation power information for recording which is expected to be used when a request for recording is next received, or the like, is reproduced from tracks in a data area for a rotation waiting time, thereby making it possible to quickly reproduce data.

Parameters and formats may be recorded by the same method as used for recording of address information into each area or by a method different from a method for recording address information.

Parameters and formats recorded in a disc information area may be recorded in not all of the defect list area 108, the spare area 109, the data area 110, the defect list area 112, the spare area 113, the data area 114, and the like. For example, when parameters and formats are not recorded in the data area 114, a recording/reproduction apparatus can recognize the data area 114 as a data area even if the data area 114 has the same track shape as that of other areas since no parameter or format is present therein.

Parameters and formats for all layers may not be recorded in tracks of the defect list area 108, the spare area 109, the data area 110, the defect list area 112, the spare area 113, and the data area 114. Each layer may contain only its own parameters and formats. Each layer may further contain minimally required information for other layers in addition to its own parameters and formats. Since information for other layers is not recorded, a more number of copies of address information can be recorded, for example. A disc substrate can be easily produced by incorporating information for other layers to be combined into the most inside portion.

Figure 4A:
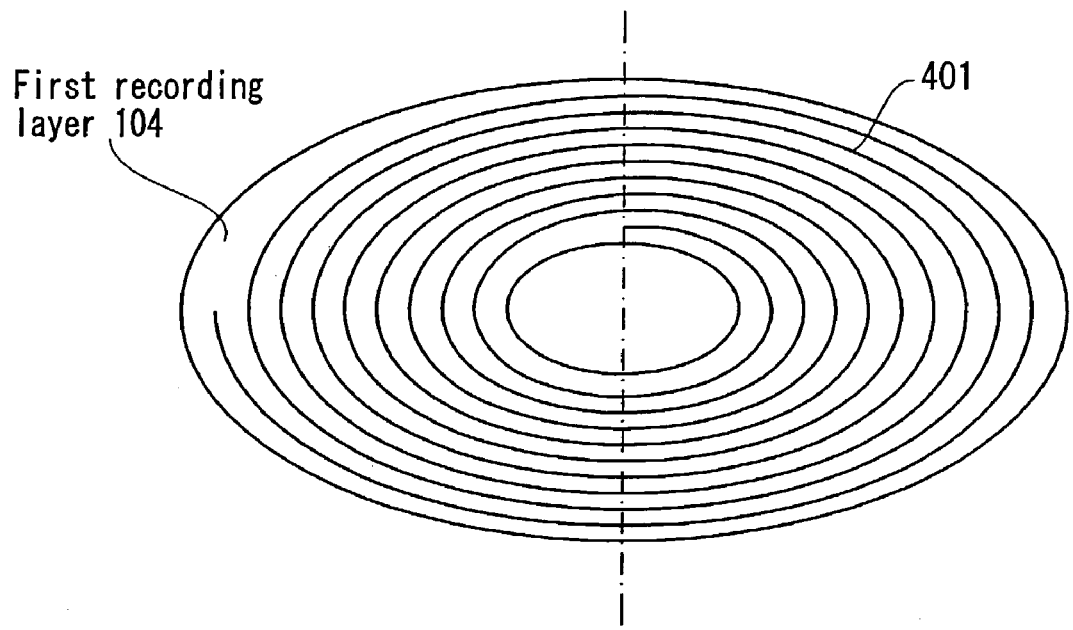
FIG. 4A is a diagram showing a track according to an embodiment of the present invention.
Figure 4B:
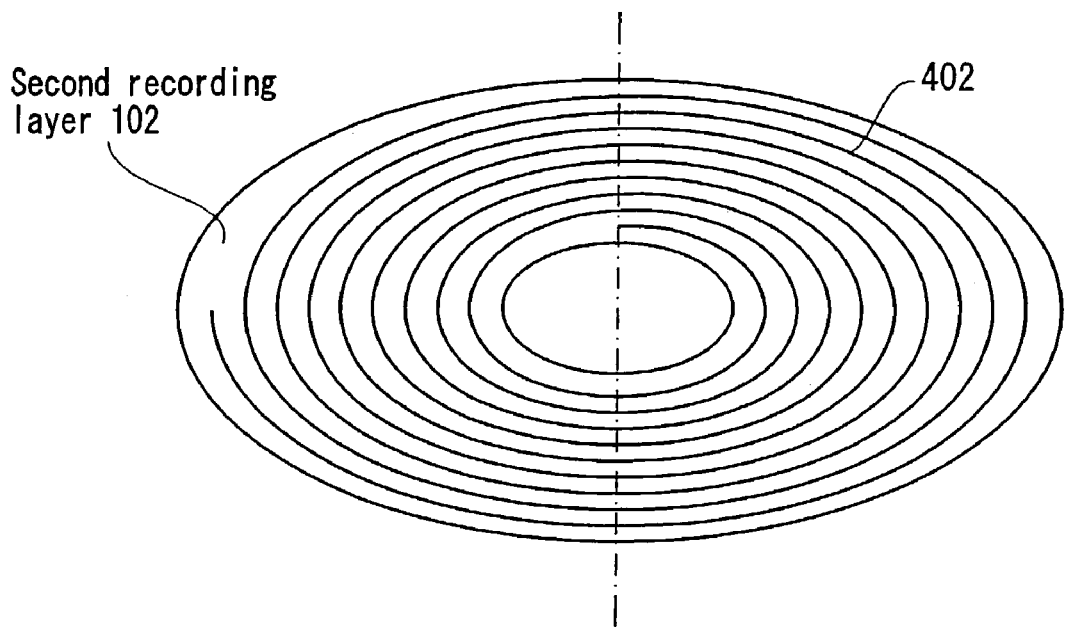
FIG. 4B is a diagram showing a track according to an embodiment of the present invention.
Figure 4C:
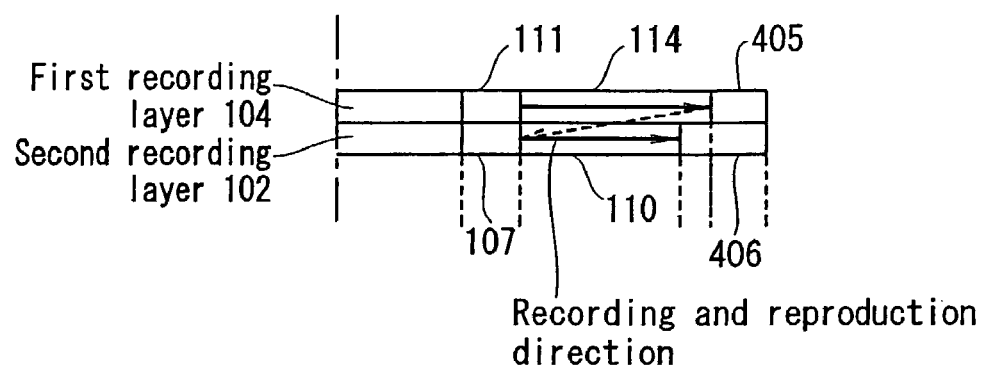
FIG. 4C is a diagram showing a recording/reproduction apparatus according to an embodiment of the present invention.
Figure 4D:
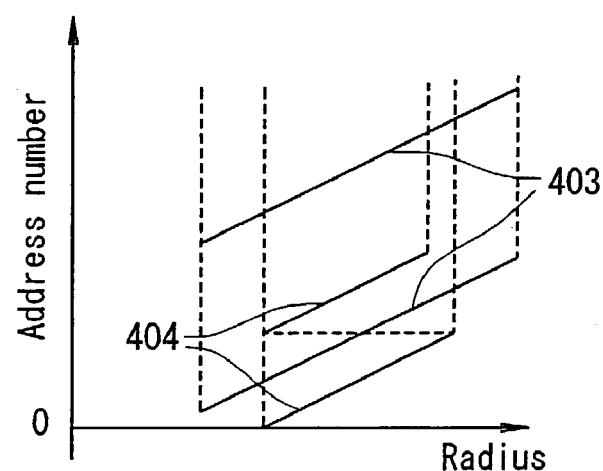
FIG. 4D is a diagram showing assignment of an address number to a recording layer according to an embodiment of the present invention.

Next, address numbers will be described with reference to FIGS. 4A to 4D and FIGS. 5A to 5D. FIGS. 4A to 4D show an example of tracks, recording/reproduction directions, and address numbers. FIG. 4A shows a pattern of spiral grooves in the first recording layer 104. FIG. 4B shows a pattern of spiral grooves in the second recording layer 102. FIG. 4C shows the recording/reproduction directions of the optical disc 100. FIG. 4D shows assignment of address numbers. When the optical disc 100 is rotated, the optical head 303 is moved from the inside circumference to the outside circumference along a track 401 or 402. When data is sequentially recorded, for example, recording is performed from the most inside circumference to the most outside circumference of the data area 114, and then from the most inside circumference to the most outside circumference of the data area 110. Physical address numbers 403 and logical address numbers 404 in each recording layer are incremented in the recording/reproduction directions. The physical address number 403 may not be started from 0 and may not be continuous at a boundary between the first and second layers.

For example, layer numbers may be contained in the physical address number 403, and may be located at an upper portion of the physical address number 403. The logical address numbers 404, which are continuously incremented from 0, are assigned to all data areas on a disc. In the data area 114 of the first layer, the logical address number 404 is 0 at the most inside circumference and is incremented one by one toward the outside circumference. In the data area 110 of the second layer, the logical address number 404 is incremented one by one from the most inside circumference toward the outside circumference, starting from the greatest number of the first layer plus 1. Reference numerals 405 and 406 indicate lead-out areas (not shown in FIG. 1), which are provided in order to allow the optical head 303 to follow a track even when the optical head 303 overrun a data area.

As shown in FIGS. 4A to 4D, it is easier to produce substrates having the same spiral direction than substrates having different spiral directions.

Figure 5A:
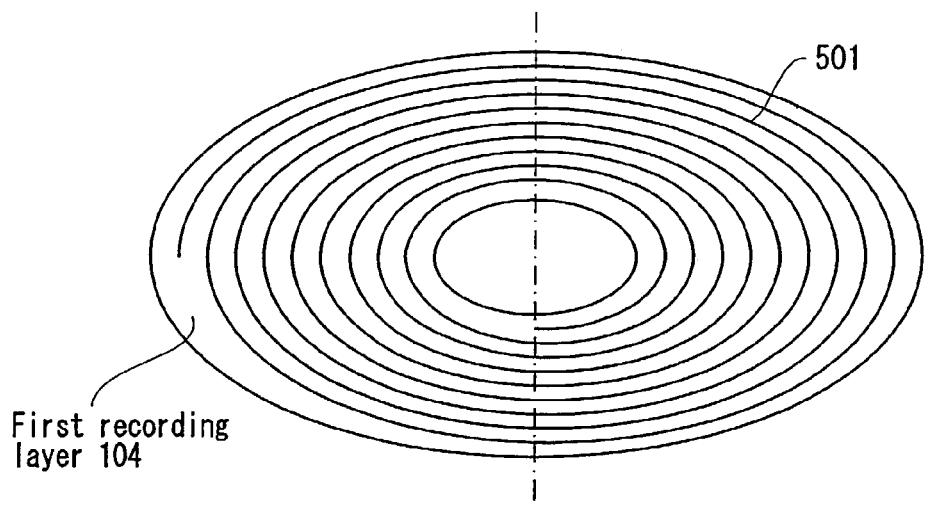
FIG. 5A is a diagram showing a track according to an embodiment of the present invention.
Figure 5B:
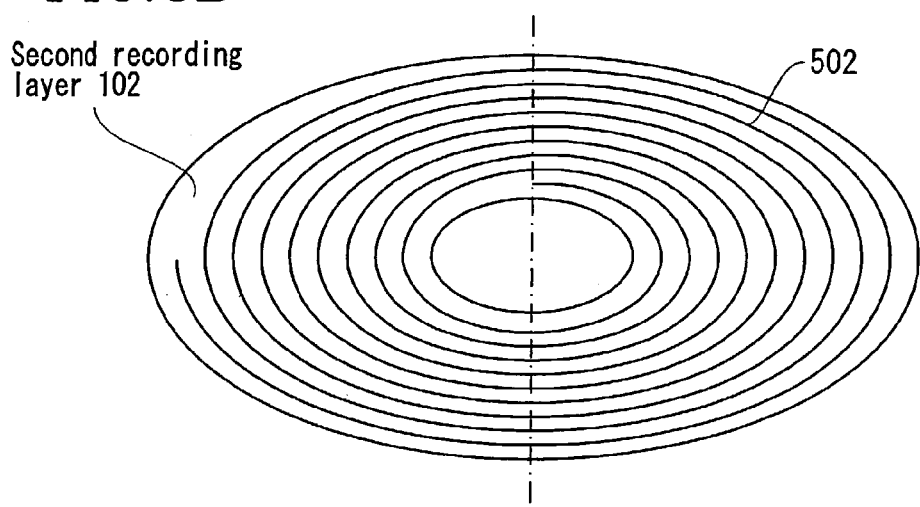
FIG. 5B is a diagram showing a track according to an embodiment of the present invention.
Figure 5C:
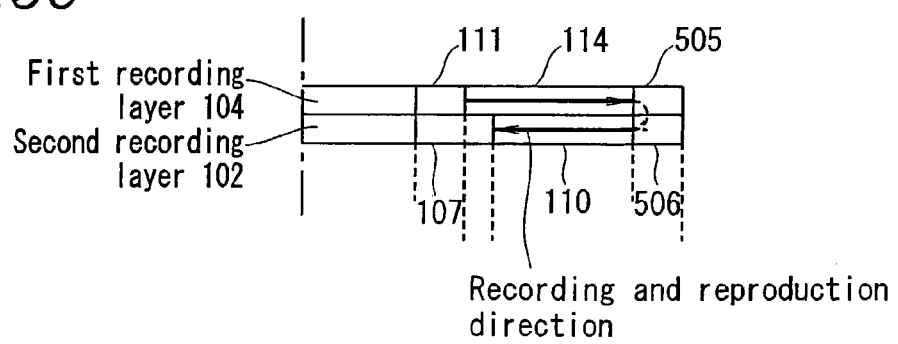
FIG. 5C is a diagram showing a recording/reproduction direction according to an embodiment of the present invention.
Figure 5D:
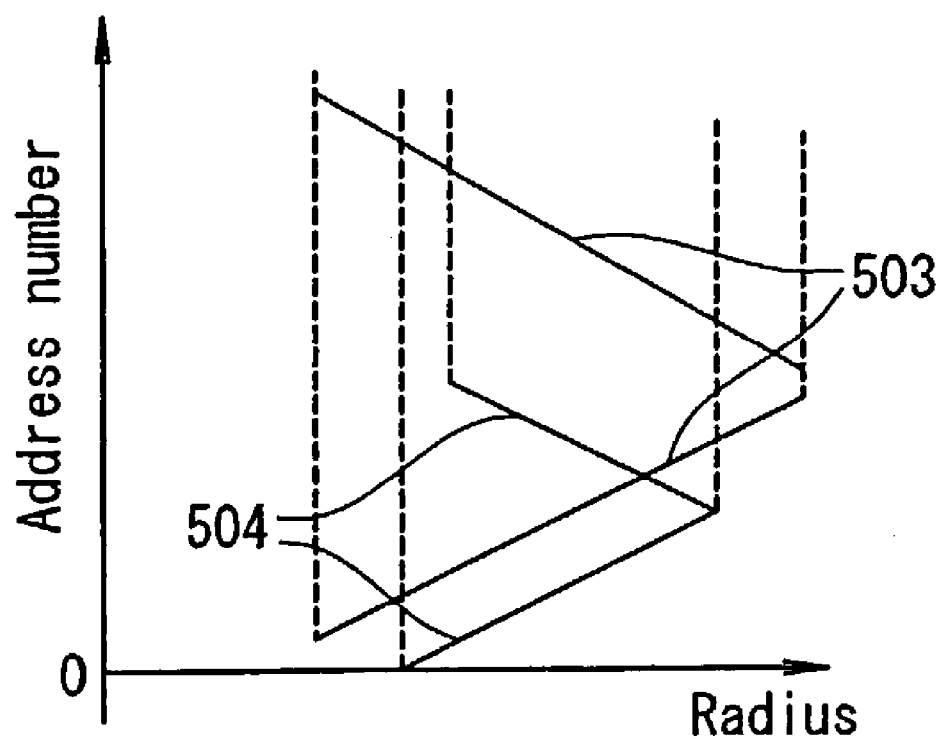
FIG. 5D is a diagram showing assignment of an address number to a recording layer according to an embodiment of the present invention.

FIGS. 5A to 5D show an example of tracks, recording/reproduction directions, and address numbers. FIG. 5A shows a pattern of spiral grooves in the first recording layer 104. FIG. 5B shows a pattern of spiral grooves in the second recording layer 102. FIG. 5C shows the recording/reproduction directions of the optical disc 100. FIG. 5D shows assignment of address numbers. When the optical disc 100 is rotated, the optical head 303 is moved from the inside circumference to the outside circumference on the first recording layer 104 along an inside track 502 and from the outside circumference to the inside circumference on the second recording layer 102 along a track 501. When data is sequentially recorded, for example, recording is performed from the most inside circumference to the most outside circumference of the data area 114, and then from the most outside circumference to the most inside circumference of the data area 110. Physical address numbers 503 and logical address numbers 504 in each recording layer are incremented in the recording/reproduction directions. Note that the second layer spiral has a direction opposite to that of the first layer spiral. Therefore, the relationship between address number and radius is reversed. In the data area 114 of the first layer, the logical address number 504 is 0 at the most inside circumference and is incremented one by one toward the outside circumference. In the data area 110 of the second layer, the logical address number 504 is incremented one by one from the most outside circumference toward the inside circumference, starting from the greatest number of the first layer plus 1. Reference numerals 505 and 506 indicate lead-out areas (not shown in FIG. 1), which are provided in order to allow the optical head 303 to follow a track even when the optical head 303 overruns a data area.

In the case where as shown in FIGS. 5A to 5D, recording is performed from the most inside circumference to the most outside circumference of the data area 114, and then from the most outside circumference to the most inside circumference of the data area 110, particularly, if all recording layer-specific parameter and format information is recorded together in a single disc information area, it is not necessary that the optical head 303 goes back from the most outside circumference to the disc information area at the most inside circumference.

Similarly, also in the case where only reproduction is performed, when reproduction is performed from the most inside circumference to the most outside circumference of the data area 114, and then, from the most outside circumference to the most inside circumference of the data area 110, particularly, if all recording layer-specific parameter and format information is recorded together in a single disc information area, it is not necessary that the optical head 303 goes back from the most outside circumference to the disc information area at the most inside circumference.

Figure 6A:
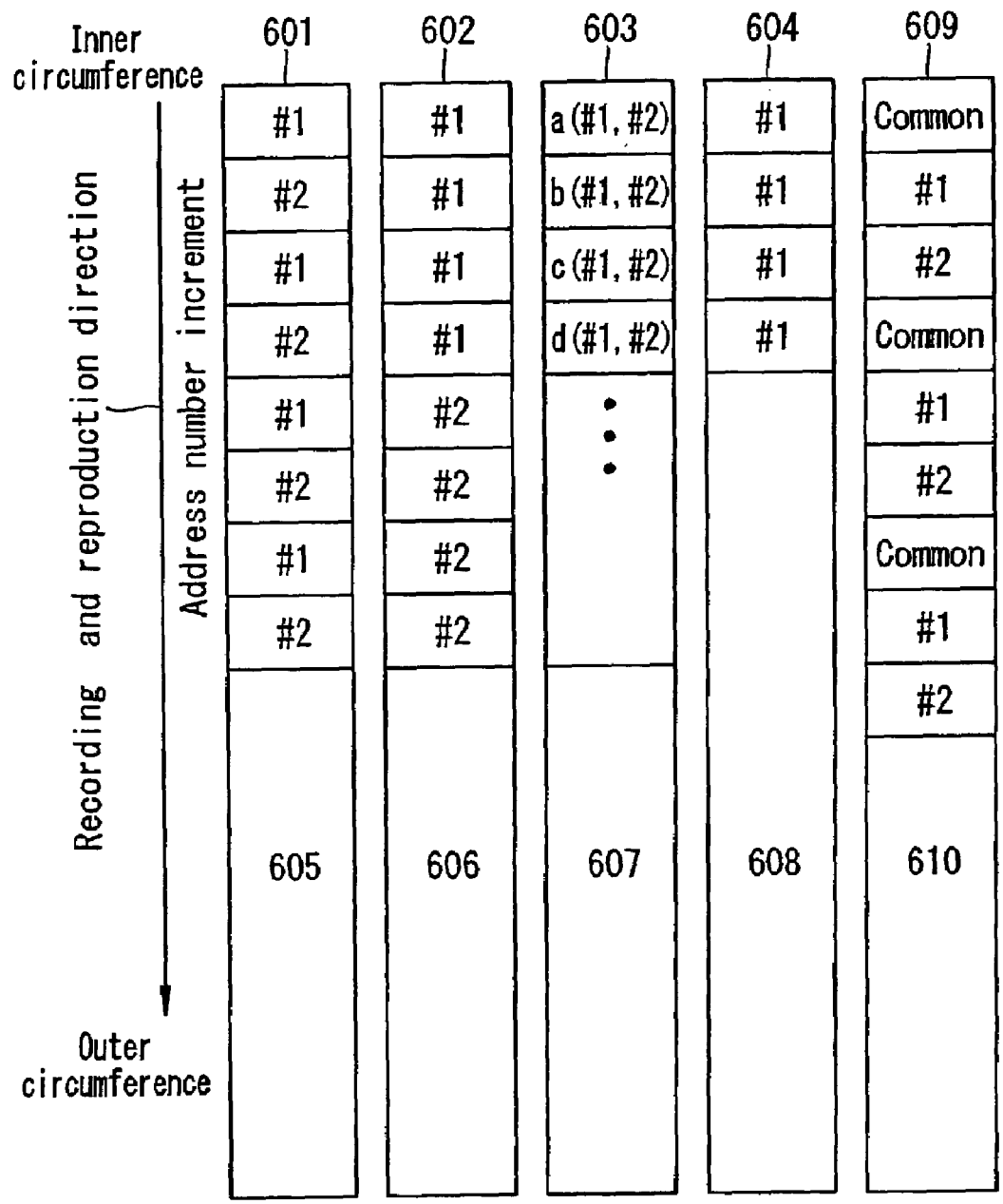
FIG. 6A is a layout of information in a disc information area.

FIG. 6A shows a layout of recording layer-specific parameters and formats in the disc information areas 107 and 111. In FIG. 6A, #1 indicates at least one of a parameter and a format relating to a first recording layer 104, and #2 indicates at least one of a parameter and a format relating to a second recording layer 102. FIG. 6A shows layouts of disc information areas 601 to 603 and 609 in a two-layer disc. The disc information areas 601 to 603 and 609 correspond to the disc information areas 107 and 111. An information layout of a disc information area 604 is of a single-layer disc.

Note that the layout rule of the disc information area 601 to 603 and 609 in a two-layer disc can be applied to a multi-layer disc.

In the disc information areas 601 to 603 and 609, a plurality of sets of recording layer-specific parameter and format information are recorded. Thus, by recording a plurality sets, even if reproduction cannot be performed on one area due to a scratch or dust, desired information can be reproduced and obtained from another area.

The length of an area in which parameters and formats are recorded is desirably the same irrespective of a layer to which the parameters and formats relate. In this case, the starting position of information can be specified, thereby making it possible to reduce a waiting time or making it unnecessary to search for a starting position for each recording layer for each set. Therefore, the structure of a recording/reproduction apparatus can be simplified. For example, in a disc information area, the length of an area in which parameters and formats relating to the first recording layer 104 are stored is the same as the length of an area in which parameters and formats relating to the second recording layer 102 are stored.

In the disc information area 601, a set of parameter and format information for all recording layers is repeated 4 times. For example, data "0" is recorded in a remaining area 605 in the disc information area 601. In this case, when recording and reproduction are performed from the inside circumference to the outside circumference, by recording parameters and formats for a recording layer to be first reproduced (e.g., the first recording layer 104 as a reference layer) at the most inside circumference, it is possible to quickly obtain parameters and formats for a layer to be first reproduced, and it is possible to quickly correct irradiation power when the irradiation power is inappropriate for the layer to be first reproduced. An address assigned to an area storing parameters and formats relating to the first recording layer 104 in a disc information area is smaller than an address assigned to an area storing parameters and formats relating to the second recording layer 102 in the disc information area. In this case, an address assigned to an area storing irradiation power information relating to the first recording layer 104 in a disc information area is smaller than an address assigned to an area storing irradiation power information relating to the second recording layer 102 in the disc information area. With this feature, for example, it is possible to minimize damage to data due to an excessively high level of irradiation power.

Similarly, when reproduction is performed from the outside circumference to the inside circumference, by recording information for a recording layer to be first reproduced at the most outside circumference, it is possible to quickly correct irradiation power when irradiation power is inappropriate for a layer to be first reproduced. Moreover, it is possible to reproduce information from all recording layers quickly as compared to 602 described below.

When the information amount of parameters and formats relating to the first recording layer 104 and the second recording layer 102 is small, the parameters and formats relating to the first recording layer 104 and the parameters and formats relating to the second recording layer 102 may be stored in an area having the same address assigned thereto in the disc information area 107. It is now assumed that addresses are assigned in the first recording layer 104 along a circumference direction from the inside circumference to the outside circumference of the optical disc 100. In this case, an area in which the parameters and formats relating to the first recording layer 104 in the area having the same address assigned thereto in the disc information area 107, is provided in a more inside circumference than an area in which the parameters and formats relating to the second recording layer 102 in the area having the same address assigned thereto in the disc information area 107. Alternatively, it is now assumed that addresses are assigned in the first recording layer 104 along a circumference direction from the outside circumference to the inside circumference of the optical disc 100. In this case, an area in which the parameters and formats relating to the first recording layer 104 in the area having the same address assigned thereto in the disc information area 107, is provided in a more outside circumference than an area in which the parameters and formats relating to the second recording layer 102 in the area having the same address assigned thereto in the disc information area 107.

Note that in the disc information area 107 included in the second recording layer 102, an address assigned to an area in which the parameters and formats relating to the second recording layer 102 are stored may be smaller than an address assigned to an area in which the parameters and formats relating to the first recording layer 104 are stored. Therefore, even when reproduction is performed on the second recording layer 102 earlier than on the first recording layer 104, the parameters and formats relating to the second recording layer 102 can be quickly obtained. As a result, even when the irradiation power of laser light irradiating the second recording layer 102 is inappropriate, the irradiation power can be quickly corrected.

Information indicating the amount of net data in the disc information area 601 excluding the area 605 (e.g., represented by in units of byte) may be recorded in the vicinity of the most inside circumference of the disc information area 601. Therefore, a recording/reproduction apparatus does not reproduce unnecessary data and can perform a subsequent process quickly. The amount of net data may vary depending on a recording layer. Alternatively, the amount of net data may be recorded in the vicinity of the most inside circumference of a disc information area of each recording layer.

In the disc information area 601, a set of information for all recording layers is repeated 4 times. The present invention is not so limited. Information indicating the number of repetition may be recorded in the vicinity of the most inside circumference of the disc information area 601. Thereby, a recording/reproduction apparatus does not reproduce unnecessary data and can perform a subsequent process quickly.

In the disc information area 602, a set of parameter and format information for each recording layer is repeated 4 times. For example, data "0" is recorded in a remaining area 606 in the disc information area 601. In this case, by recording information for a recording layer to be first reproduced at the most inside circumference, it is possible to quickly correct irradiation power when irradiation power is inappropriate for a layer to be first reproduced. In this case, an address assigned to an area storing parameters and formats relating to the first recording layer 104 in a disc information area is smaller than an address assigned to an area storing parameters and formats relating to the second recording layer 102 in the disc information area. Since the layout of information in the disc information area 604 which is of a single-layer disc is the same as the layout of information at the inside circumference of the disc information area 602, it is possible to produce the optical disc 100 whose reproduction algorithm has the same form as that added to a single-layer optical disc. Therefore, it is possible to simplify a recording/reproduction apparatus.

Information indicating the amount of net data in the disc information area 602 excluding the area 606 (e.g., represented by in units of byte) may be recorded in the vicinity of the most inside circumference of the disc information area 602. Therefore, a recording/reproduction apparatus does not reproduce unnecessary data and can perform a subsequent process quickly. The amount of net data may vary depending on a recording layer. Alternatively, the amount of net data may be recorded in the vicinity of the most inside circumference of a disc information area of each recording layer.

In the disc information area 602, a set of information for each recording layer is repeated 4 times. The present invention is not so limited. Information indicating the number of repetition may be recorded in the vicinity of the most inside circumference of the disc information area 602. Thereby, a recording/reproduction apparatus does not reproduce unnecessary data and can perform a subsequent process quickly. The number of repetition may vary depending on a recording layer. The number of repetition of a set of information for each recording layer may be recorded in the vicinity of the most inside circumference of the disc information area 602.

In the disc information area 603, parameter and format information for recording and reproduction are divided into each element. Each specific element is collected for all recording layers. Such a collection is recorded as a set of information. Regarding a method for repetition, as in the disc information area 601, a set of information in which a complete set of elements are arranged is repeated a plurality of times, or alternatively, as in the disc information area 602, an element is recorded a plurality of times and then another element is recorded a plurality of times.

Data "0" is recorded in a remaining area 607 in the disc information area 603. By recording information for a recording layer to be first reproduced at the most inside circumference, it is possible to quickly correct irradiation power when irradiation power is inappropriate for a layer to be first reproduced.

Information indicating the amount of net data in the disc information area 603 excluding the area 607 (e.g., represented by in units of byte) may be recorded in the vicinity of the most inside circumference of the disc information area 603. Therefore, a recording/reproduction apparatus does not reproduce unnecessary data and can perform a subsequent process quickly.

By recording predetermined data in a remaining portion of the disc information areas 601 to 604 in which parameter and format information are recorded, when an optical head 203 is moved to a disc information area by a servo circuit 205, the disc information area can be quickly recognized by reproducing the predetermined data.

In the disc information area 601 to 603, information for each recording layer is recorded in a direction in which address numbers are incremented as shown in FIGS. 4D and 5D. For example, as shown in FIG. 5D, when spiral directions are opposite to each other, physical arrangement of information is reversed between the first recording layer and the second recording layer. For example, recording is performed on the first recording layer from the most inside circumference portion of a disc information area, while recording is performed on the second recording layer from the most outside circumference portion of a disc information area. The present invention is not so limited. Alternatively, recording is performed on both the first and second recording layer from the most inside circumference portion of a disc.

In the disc information areas 601 to 603, parameter and format information or disc information which are common to recording layers may be recorded before recording information specific for each layer. Parameters and formats are recorded in accordance with such a method in a disc information area 609. By using a single set of common items, a disc information area can be relatively reduced as the number of layers is increased. By recording the common items a plurality of times similar to information #1 and #2 as in FIG. 6A, even if predetermined information is not reproduced from an area due to a scratch or dust, the information can be reproduced and obtained from another area.

The length of an area for recording common items of recording layers is desirably a multiple of the length of an area for recording information of each recording layer. Therefore, even if the number of layers or the amount of common items is changed, it is easy for a recording/reproduction apparatus to predict the starting position of information, thereby making it possible to reduce a waiting time and to simplify the structure of a recording/reproduction apparatus.

Figure 6B:
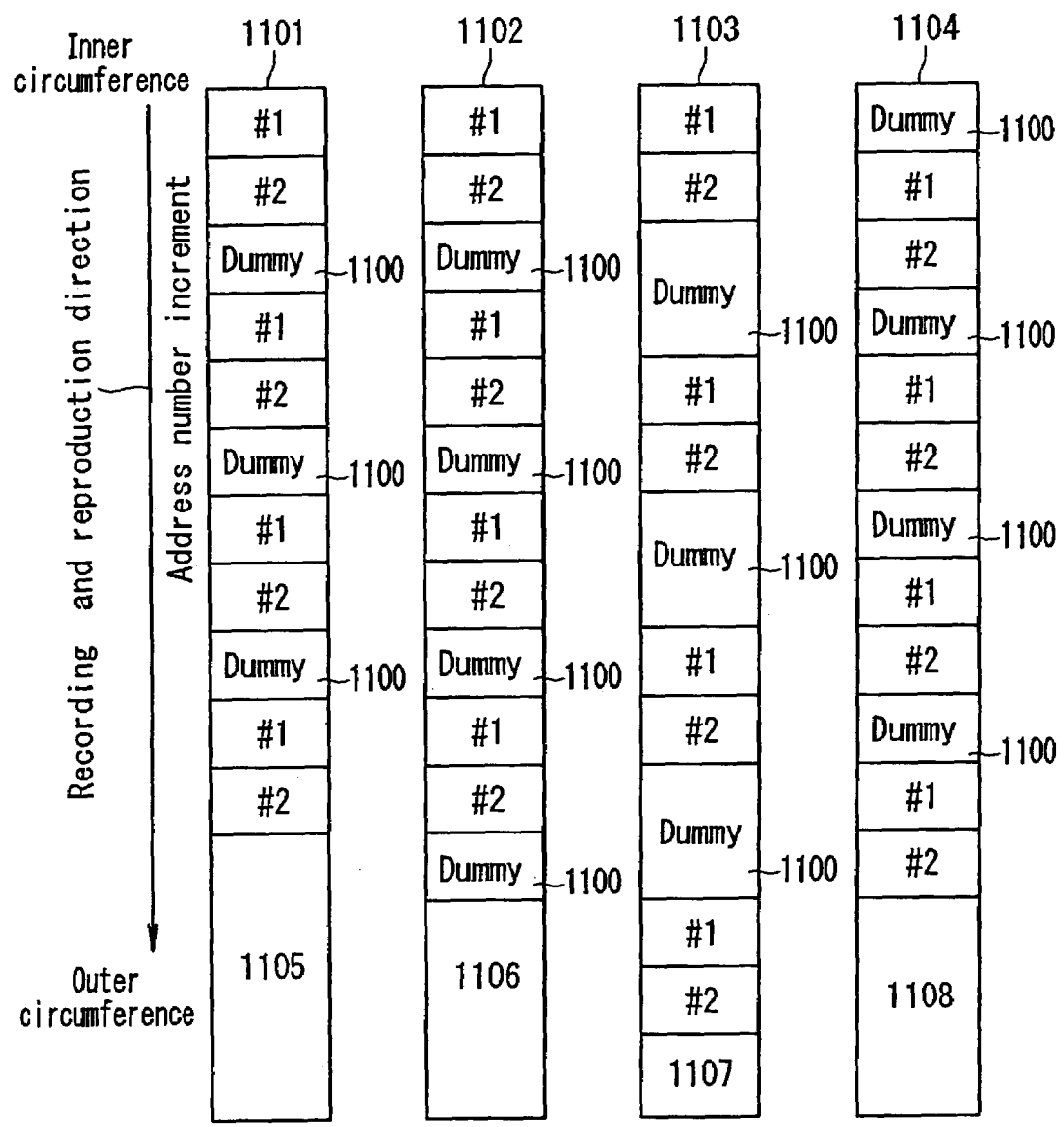
FIG. 6B is a layout of information in a disc information area.

Next, FIG. 6B shows a modified example of the disc information area 601, i.e., disc information areas 1101, 1102, 1103 and 1104. The disc information areas 1101, 1102, 1103 and 1104 contain a plurality of dummy areas 1100.

In the disc information area 1101, a set of parameter and format information for all recording layers is repeatedly recorded, and a dummy area is provided between each area in which a set of information is recorded. Therefore, by detecting the dummy area, it can be recognized that information #1 is recorded in an area immediately after the dummy area or information #2 is recorded immediately before the dummy area. Therefore, it is no longer necessary to provide an identifier indicating information #1 or #2 therein, whereby the structure of a recording/reproduction apparatus can be simplified and a processing time can be reduced.

In the dummy area, the same contents as recorded in a remaining area 1105 in a disc information area (e.g., data "0") may be recorded, or alternatively, different contents may be recorded. By recording different contents, it can be clearly recognized that information #1 is recorded in an area immediately after the dummy area or information #2 is recorded immediately before the dummy area. Even if the same contents are recorded, the dummy can be clearly distinguished from the area 1105 by changing the recording length, resulting in the same effect.

By recording information common to information #1 and #2 in a dummy area as show in the disc information area 609 (FIG. 6A), it can be recognized that information #1 is recorded in an area immediately after the dummy area or information #2 is recorded immediately before the dummy area, and it is easy to obtain common information.

As shown in the disc information area 1102, a dummy area 1100 may be contiguous to an area 1106, whereby it can be recognized that information #2 is recorded in at least an area immediately before the dummy data 1100. Note that only the last dummy area in the disc information area 1102 may contain recording contents different from those of the other dummy areas. In this case, the end of the recording repetition can be clarified.

The length of a dummy area may be an integral multiple of the length of an area in which a set of information #1 and information #2 are recorded, as shown in a disc information area 1103. Therefore, even if the number of layers is different, it is easy to predict the starting position of information in each recording layer, thereby making it possible to reduce awaiting time and to simplify the structure of a reproduction apparatus.

As shown in a disc information area 1104, a dummy area 1100 may be recorded before an area in which information #1 and information #2 are first recorded. Therefore, it can be recognized that information #1 is recorded in at least an area immediately after the dummy data. Note that only the first dummy area in the disc information area 1104 may have the contents different from the contents of the other dummy areas. Therefore, the start of repetition of recording can be clarified.

The setting of the first dummy area is not limited to the above-described method, if a disc information area can be distinguished from an area immediately before the disc information area. For example, an area immediately before a disc information area may be recognized based on the difference in a track shape or a modulation method for overlaying information on the track shape.

Note that the dummy data shown in FIG. 6B can be used in the disc information area 602, resulting in substantially the same effect as when applied to the disc information area 601.

As described above, by recording recording layer-specific parameter and format information required for performing recording and reproduction on each recording layer in a single disc information area, a time required to record and reproduce data from a plurality of layers can be reduced as compared to when information is reproduced from a plurality of disc information areas provided in a plurality of layers.

In this embodiment, the disc information area is mainly described. In addition, regarding a defect list area and a spare area, the same effect is obtained by recording information for each recording layer in a single layer.

In this embodiment, recording layer-specific parameter and format information required for performing recording and reproduction on each recording layer is recorded in a single disc information area. Alternatively, all of such information may not be recorded in a single disc information area and maybe divided and recorded in a plurality of disc information areas. Alternatively, a predetermined essential information item(s) for each recording layer may be recorded in a single disc information area, while other items may be recorded in a disc information area of each layer.

Note that parameters and formats recorded in a disc information area may be recorded in tracks in the defect list area 108, the spare area 109, the data area 110, the defect list area 112, the spare area 113, data area 114 in accordance with the layouts shown in FIGS. 6A and 6B.

Next, a rewritable optical disc 900 according to another embodiment of the present invention will be described with reference to FIG. 9.

The optical disc 900 of FIG. 9 comprises a first substrate 905, a first recording layer 904, an adhesive resin 903, a second recording layer 902, and a second substrate 901. Each substrate and each recording layer are provided with a clamp hole 906. The optical disc 900 comprises a data area 920 for recording user data. The data area 920 is provided in both the first recording layer 904 and the second recording layer 902. A data area 912 which is a portion of the data area 920 is provided in the second recording layer 902, while a data area 918 which is the other portion of the data area 920 is provided in the first recording layer 904.

The second recording layer 902 comprises a disc information area 907, a first defect list area 908, a test recording area 909, a second defect list area 910, a spare area 911, and a data area 912.

The first recording layer 904 comprises a disc information area 913, a first defect list area 914, a test recording area 915, a second defect list area 916, a spare area 917, and a data area 918.

The first recording layer 904 and the second recording layer 902 are provided on a single side of the optical disc 900.

It is desirable that the same data is recorded in the first defect list area and the second defect list area in each recording layer. The same data may be recorded in a defect list area in all recording layers. Thereby, when the spot of laser light is moved between recording layers in recording or reproduction, a time required for reproduction of a defect list area in a destination layer can be saved.

The test recording area 909 functions as an adjustment area for performing test recording for adjusting the recording power of laser light for recording information in the data area 912. Similarly, the test recording area 915 functions as an adjustment area for performing test recording for adjusting the recording power of laser light for recording information in the data area 918. As in this embodiment, by providing a test recording area in each recording layer, it is possible to determine recording conditions suitable for each recording layer.

When the spot of laser light is vertically shifted from one layer to another layer, it is difficult to locate the spot at the same radial position due to misalignment of substrates attached together, misalignment of the clamp holes of the substrates, or the like. For example, when it is attempted to move from the 1000$^{th}$ track from the inside circumference of the first recording layer 904 to the 1000$^{th}$ track from the inside circumference of the second recording layer 902, an error of about ±50 tracks occurs.

In a test recording area, recording conditions are determined by performing test recording under unstable servo recording conditions. In this case, there is the risk of tracking being displaced during recording or the risk of laser light coming into focus instantaneously on an unintended layer. To avoid these risks, a buffer area in which no intended use is defined is desirably provided contiguously before and after the test recording area of each recording layer. It is also preferable that a plurality of defect list areas are provided before and after the test recording area as shown in FIG. 9. By providing defect list areas before and after the test recording area of each recording layer, the risk of damaging all data in a defect list area can be reduced even if tracking is displaced during recording data. Further, when focus is displaced during recording of information to a certain recording layer, the risk of damaging all data in a defect list area of another recording layer can be reduced.

In this embodiment, a defect list area is provided only in the inside circumference portion of each recording layer. From the same viewpoint, a defect list area may be provided in the outside circumference portion. By providing the outside circumference portion, it is possible to prevent damage to data in a defect list area due to test recording.

Note that parameter and format information specific for each recording layer may be recorded together in a single disc information area. Alternatively, each recording layer may separately contain parameter and format information.

Figure 10:
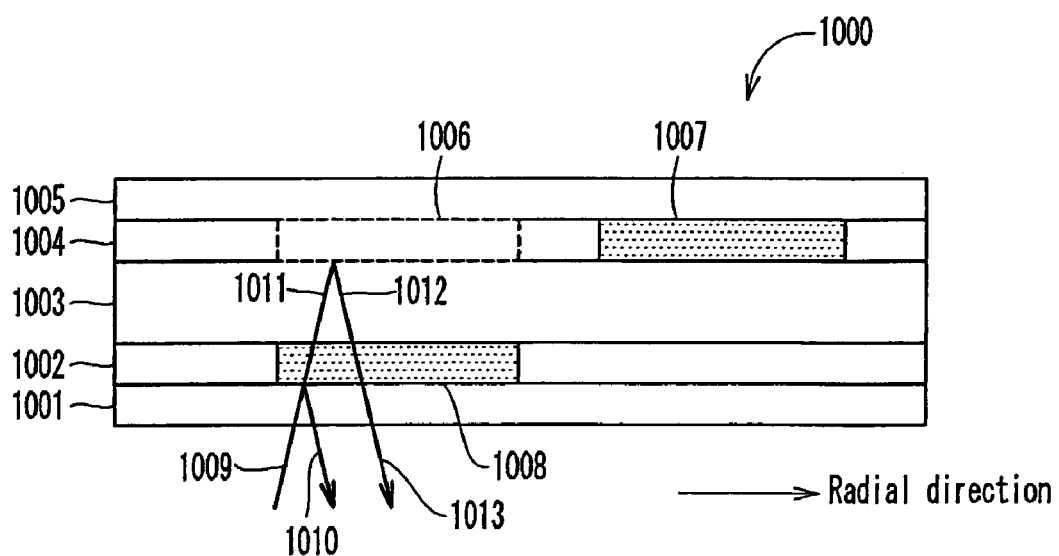
FIG. 10 is a diagram showing an optical disc according to an embodiment of the present invention.

A test recording area in each recording layer may be located at a different radial position as shown in FIG. 10. FIG. 10 shows an optical disc 1000, which is a modification of the optical disc 900, comprising a first substrate 1005, a first recording layer 1004, an adhesive layer 1003, a second recording layer 1002, and a second substrate 1001.

The second substrate 1001, the second recording layer 1002, the adhesive layer 1003, the first recording layer 1004, and the first substrate 1005 correspond to the second substrate 901, the second recording layer 902, the adhesive layer 903, the first recording layer 904, and the first substrate 905, respectively. The second recording layer 1002 and the first recording layer 1004 have the same components as those of the second recording layer 902 and the first recording layer 904, respectively, except that the location of a test recording area is different. The second recording layer 1002 comprises a test recording area 1008. The first recording layer 1004 comprises a test recording area 1007.

Reference numeral 1009 indicates incident light. Reference numeral 1010 indicates light reflected from the second recording layer 1002. Reference numeral 1011 indicates light transmitted through the second recording layer 1002. Reference numeral 1012 indicates light reflected from the first recording layer 1004. Reference numeral 1013 indicates light transmitted through the second recording layer 1002. These reference numerals indicate paths of laser light. When reproduction is performed on the second recording layer 1002, the reflected light 1010 is a main reproduction light while the transmitted light 1013 is unnecessary stray light. When reproduction is performed on the first recording layer 1004, the transmitted light 1013 is a main reproduction light while the reflected light 1010 is unnecessary stray light.

It is now assumed that a test recording area for determining the irradiation power of laser light for recording data in the recording layer 1004 is provided at the position of the area 1006. In this case, if the test recording area 1008 is degraded or damaged (e.g., due to repetition of recording), the transmittance coefficient or reflectance coefficient of the second recording layer 1002 is changed, resulting in changes in the transmitted light 1011, the reflected light 1010 and the transmitted light 1013. Therefore, as is different from when the test recording area 1008 is normal, the value of the irradiation power obtained using the test recording area 1006 departs from the correct irradiation power.

As shown in FIG. 10, by providing the test recording area 1007 and the test recording area 1008 at different radial positions of the optical disc 1000, it is possible to correctly determine the value of the irradiation power of laser light suitable for the first recording layer 1004 even when the test recording area 1008 is degraded or damaged.

As described above, arrangement of the test recording areas of each recording layer at a different radial position is very effective when the optical disc 1000 is a write-once-read-many optical disc capable of recording only once, particularly an optical disc having a irreversible recording film whose optical characteristics are changed by recording. The present invention is applied to such an optical disc capable of recording only once.

In this embodiment, a test recording area in each recording layer is provided at a different radial position. Alternatively, in addition to the test recording area, for example, an area for managing a list of all data recorded in an optical disc or the like, which is repeatedly recorded a predetermined number of times which is greater than the number of repetitions of recording in an area in which normal user data is recorded, maybe positioned at a different radial position in each recording layer. By providing such areas at different positions, it is possible to prevent degradation of the area in one layer from affecting the area in another layer, whereby recording and reproduction can be performed on the area in the other layer.

In this embodiment, the test recording area 1007 is provided at the outside circumference side with respect to the radial direction. Alternatively, the test recording area 1008 may be provided at the outside circumference side with respect to the radial direction. For example, in the case of the recording/reproduction directions as shown in FIG. 5C, the test recording area 1007 may be used from the inside circumference side, while the test recording area 1008 may be used from the outside circumference side. In this case, when the test recording area 1008 is used, the probability that the most outside circumference side of the test recording area 1007 is not used is higher than when it is used. Therefore, an influence of degradation of the test recording area 1007 on the test recording 1008 can be further reduced. The effect is very large for an optical disc capable of recording only once.

In this embodiment, a test recording area is provided only on the inside circumference side. Alternatively, it may be provided on the outside circumference side.

The present invention is not limited to an optical disc having a recordable recording layer. If an optical disc having a plurality of reproduction-only recording layers has a disc information area, the same effect is obtained according to the present invention.

In this embodiment, recording is performed on two layers, i.e., the first recording layer and the second recording layer. When the present invention can be applied to a single-layer disc, the same effect can be obtained.

In this embodiment, a rewritable optical disc is mainly described. The present invention can be applied to a recordable optical disc in which recording can be performed once or several times and the same effect can be obtained.

According to the optical disc of the present invention, parameters and formats specific for each recording layer required for performing recording and reproduction on the recording layer is recorded together in a single disc information area. With this feature, parameters and formats for each recording layer can be reproduced from a single disc information area, thereby making it possible to reduce a time required for recording and reproduction of data for a plurality of recording layers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium, comprising:
   a plurality of recording layers; and
   a disc information area in which disc information relating to the plurality of recording layers are stored,
   wherein the disc information area is provided in a first recording layer which is one of the plurality of recording layers and a second recording layer which is another one of the plurality of recording layers,
   a dummy data is recorded in a remaining area of the disc information area, and
   a length of an area for storing the dummy data is an integer multiple of a length of the disc information area.

2. A recording/reproduction apparatus for performing at least one of recording information into an information recording medium and reproducing information from the information recording medium, wherein
   the information recording medium comprises:
      a plurality of recording layers; and
      a disc information area in which disc information relating to the plurality of recording layers are stored,
   wherein the disc information area is provided in a first recording layer which is one of the plurality of recording layers and a second recording layer which is another one of the plurality of recording layers,
   a dummy data is recorded in a remaining area of the disc information area, and
   a length of an area for storing the dummy data is an integer multiple of a length of the disc information area,
   the recording/reproduction apparatus comprises:
      an optical head capable of performing at least one of optically writing the information into the information recording medium and optically reading the information from the information recording medium; and
      a control section for controlling a recording/reproduction process using the optical head, and
   wherein the recording/reproduction process comprises:
      reproducing the disc information stored in the disc information area; and
      at least one of recording the information into the information recording medium and reproducing the information from the information recording medium, based on the reproduced disc information.

3. A recording/reproduction control apparatus for performing at least one of a recording information into an information recording medium and reproduction information into an information recording medium and reproducing information from the information recording medium, wherein
   the information recording medium comprises:
      a plurality of recording layers; and
      a disc information area in which disc information relating to the plurality of recording layers are stored,
         wherein the disc information area is provided in a first recording layer which is one of the plurality of recording layers and a second recording layer which is another one of the plurality of recording layers,
         a dummy data is recorded in a remaining area of the disc information area, and
         a length of an area for storing the dummy data is an integer multiple of a length of the disc information area,
   the recording/reproduction control apparatus comprises:
      reproducing the disc information stored in the disc information area; and
      at least one of recording of the information into the information recording medium and reproducing the information from the information recording medium, based on the reproduced disc information.

* * * * *

UNITED STATES PATENT AND TRADEMARK OFFICE
CERTIFICATE OF CORRECTION

| | |
|---|---|
| PATENT NO. | : 7,170,841 B2 |
| APPLICATION NO. | : 10/348027 |
| DATED | : January 30, 2007 |
| INVENTOR(S) | : Mamoru Shoji et al. |

It is certified that error appears in the above-identified patent and that said Letters Patent is hereby corrected as shown below:

Title page, item (57) (Abstract), Line 5, "plurality of recording layer."
    should read -- plurality of recording layers. --.

Column 24, line 30, "control apparatus" should read -- method --;
    Lines 33-34, "into an information recording medium and reproducing
        information" should be deleted;
    Line 52, "control apparatus" should read -- method --; and
    Line 56, "recording of" should read -- recording --.

Signed and Sealed this

First Day of May, 2007

JON W. DUDAS
*Director of the United States Patent and Trademark Office*